(12) United States Patent
Zhang et al.

(10) Patent No.: US 11,593,650 B2
(45) Date of Patent: Feb. 28, 2023

(54) DETERMINING CONFIDENT DATA SAMPLES FOR MACHINE LEARNING MODELS ON UNSEEN DATA

(71) Applicant: GE Precision Healthcare LLC, Milwaukee, WI (US)

(72) Inventors: Min Zhang, San Ramon, CA (US); Gopal B. Avinash, San Ramon, CA (US); Zili Ma, San Ramon, CA (US); Kevin H. Leung, San Ramon, CA (US); Wen Jin, Fremont, CA (US)

(73) Assignee: GE Precision Healthcare LLC, Milwaukee, WI (US)

( * ) Notice: Subject to any disclaimer, the term of this patent is extended or adjusted under 35 U.S.C. 154(b) by 303 days.

(21) Appl. No.: 16/934,650

(22) Filed: Jul. 21, 2020

(65) Prior Publication Data
US 2020/0349434 A1 Nov. 5, 2020

Related U.S. Application Data

(63) Continuation-in-part of application No. 16/366,455, filed on Mar. 27, 2019.

(60) Provisional application No. 62/879,155, filed on Jul. 26, 2019.

(51) Int. Cl.
*G06N 3/04* (2006.01)
*G06N 3/08* (2023.01)
*G06F 16/28* (2019.01)

(52) U.S. Cl.
CPC ............. *G06N 3/08* (2013.01); *G06F 16/285* (2019.01); *G06N 3/0427* (2013.01)

(58) Field of Classification Search
CPC .......... G06N 3/04; G06N 3/08; G06N 3/0427; G06F 16/28; G06F 16/285
See application file for complete search history.

(56) References Cited

U.S. PATENT DOCUMENTS

| 10,970,631 B2 | 4/2021 | Sim et al. |
| 2011/0025834 A1* | 2/2011 | Chen ........................ H04N 7/18 348/E7.091 |

(Continued)

OTHER PUBLICATIONS

Chen, et al., "Confidence Scoring Using Whitebox Meta-models with Linear Classifier Probes," arXiv:1805.05396v2 [cs.LG] Mar. 14, 2019, 9 pages.

(Continued)

*Primary Examiner* — Tuan H Nguyen
(74) *Attorney, Agent, or Firm* — Amin, Turocy & Watson, LLP

(57) ABSTRACT

Techniques are provided for determining confident data samples for machine learning (ML) models on unseen data. In one embodiment, a method is provided that comprises extracting, by a system comprising a processor, a feature vector for a data sample based on projection of the data sample onto a standard feature space. The method further comprises processing, by the system, the feature vector using an outlier detection model to determine whether the data sample is within a scope of a training dataset used to train a machine learning model, wherein the outlier detection model was trained using features extracted from the training dataset based on projection of data samples included in the training dataset onto the standard feature space.

20 Claims, 14 Drawing Sheets

(56) References Cited

U.S. PATENT DOCUMENTS

2011/0119212 A1* 5/2011 De Bruin ............... A61B 5/00
706/12
2018/0204111 A1 7/2018 Zadeh et al.

OTHER PUBLICATIONS

Gal, et al., "Dropout as a Bayesian Approximation: Representing Model Uncertainty in Deep Learning," First Date of Publication: Jun. 6, 2015. Proceedings of the 33 rd International Conference on Machine Learning, New York, NY, USA, 2016. JMLR: W&CP vol. 48. Copyright 2016 by the author(s).
Nair, et al., "Exploring Uncertainty Measures in Deep Networks for Multiple Sclerosis Lesion Detection and Segmentation," arXiv:1808. 01200v2 [cs.CV] Oct. 16, 2018, 9 pages.
Leibig, et al., "Leveraging uncertainty information from deep neural networks for disease detection," Scientific Reports (2017) 7:17816 | DOI:10.1038/s41598-017-17876-z. 14 pages.
Geifman, et al., "Selective Classification for Deep Neural Networks," 31st Conference on Neural Information Processing Systems (NIPS 2017), Long Beach, CA, USA. First Date of Publication: May 23, 2017, 10 pages.
Hendrycks, et al., "A Baseline for Detecting Misclassified and Out-of-Distribution Examples in Neural Networks," arXiv:1610. 02136v3 [cs.NE] Oct. 3, 2018, 12 pages.
Salimans, et al., "Improved Techniques for Training GANs," arXiv:1606. 03498v1 [cs.LG] Jun. 10, 2016, 10 pages.
Heusel, et al., "GANs Trained by a Two Time-Scale Update Rule Converge to a Local Nash Equilibrium," arXiv:1706.08500V6 [cs.LG] Jan. 12, 2018, 38 pages.
Deng, et al., "ImageNet: A Large-Scale Hierarchical Image Database," Published Online: Aug. 18, 2009, 8 pages.
Simonyan, et al., "Very Deep Convolutional Networks for Large-Scale Image Recognition," arXiv:1409.1556v6 [cs.CV] Apr. 10, 2015, 14 pages.
Lecun, et al., "Gradient-Based Learning Applied to Document Recognition," Proceedings of the IEEE, vol. 86, No. 11, Nov. 1998. Manuscript, 46 pages.
Hull, "A Database for Handwritten Text Recognition Research," IEEE Transactions on Pattern Analysis and Machine Intelligence, vol. 16, No. 5, May 1994, Manuscript; 5 pages.
Netzer, et al., "Reading Digits in Natural Images with Unsupervised Feature Learning," Dec. 16, 2011, 9 pages.
Wang, et al., "ChestX-ray8: Hospital-scale Chest X-ray Database and Benchmarks on Weakly-Supervised Classification and Localization of Common Thorax Diseases," arXiv:1705.02315v5 [cs.CV] Dec. 14, 2017, 19 pages.
He, et al., "Deep Residual Learning for Image Recognition," arXiv:1512.03385v1 [cs.CV] Dec. 10, 2015, 12 pages.
Huang, et al., "Densely Connected Convolutional Networks," arXiv:1608.06993v5 [cs.CV] Jan. 28, 2018, 9 pages.
Szegedy, et al., "Rethinking the Inception Architecture for Computer Vision," arXiv:1512.00567v3 [cs.CV] Dec. 11, 2015, 10 pages.
Liu, et al., "Isolation Forest," 2008 Eighth IEEE International Conference on Data Mining, Dec. 15, 2008, 10 pages.
Moya, et al., "Network Constraints and Multi-objective Optimization for One-class Classification," Neural Networks, vol. 9, No. 3, pp. 463-474, 1996, 12 pages.
Younis, et al., "Leveraging Deep Learning Artificial Intelligence in Detecting the Orientation of Chest X-ray Images," Conference on Machine Intelligence in Medical Imaging, Sep. 22, 2019, 3 pages.
Chollet, et al., "Deep Learning with Python," ISBN 9781617294433, Manning Publications, Dec. 26, 2017, 386 pages.
Kingma, et al., "Adam: A Method for Stochastic Optimization," arXiv:1412.6980v9 [cs.LG] Jan. 30, 2017, 15 pages.
Non-Final Office Action received for U.S. Appl. No. 16/366,455 dated Jun. 13, 2022, 26 pages.
International Search Report and Written Opinion received for International PCT Application Serial No. PCT/US2020/021851 dated Jun. 18, 2020, 9 pages.
Leveau et al., "Adversarial Autoencoders for Novelty Detection", International Conference on Learning Representations, 2017, 6 pages.
Li et al., "Domain Generalization with Adversarial Feature Learning", IEEE/CVF Conference on Computer Vision and Pattern Recognition, 2018, pp. 5400-5409.

* cited by examiner

| MNIST Test Data | | ResNet50 (99.53%) | | | | | DenseNet121 (99.67%) | | | | |
|---|---|---|---|---|---|---|---|---|---|---|---|
| Outlier Ratio | | 0.1 | 0.2 | 0.3 | 0.4 | 0.5 | 0.1 | 0.2 | 0.3 | 0.4 | 0.5 |
| IF | In | 99.54 | 99.57 | 99.61 | 99.59 | 99.69 | 99.68 | 99.72 | 99.68 | 99.66 | 99.73 |
|  | Out | 99.47 | 99.36 | 99.33 | 99.43 | 99.36 | 99.53 | 99.48 | 99.65 | 99.69 | 99.61 |
| OCSVM | In | 99.53 | 99.57 | 99.55 | 99.62 | 99.61 | 99.69 | 99.68 | 99.66 | 99.69 | 99.69 |
|  | Out | 99.49 | 99.38 | 99.48 | 99.39 | 99.45 | 99.49 | 99.64 | 99.69 | 99.64 | 99.65 |
| USPS Benchmark | | ResNet50 (83.30%) | | | | | DenseNet121 (91.49%) | | | | |
| Outlier Ratio | | 0.1 | 0.2 | 0.3 | 0.4 | 0.5 | 0.1 | 0.2 | 0.3 | 0.4 | 0.5 |
| IF | In | 83.53 | 83.82 | 84.34 | 85.09 | 85.87 | 91.61 | 91.65 | 91.77 | 91.93 | 92.34 |
|  | Out | 81.88 | 81.6 | 81.14 | 80.87 | 80.91 | 90.64 | 90.92 | 90.85 | 90.84 | 90.62 |
| OCSVM | In | 83.61 | 83.63 | 84.41 | 85.25 | 86.59 | 91.37 | 91.09 | 90.9 | 90.93 | 91.54 |
|  | Out | 81.87 | 82.55 | 81.63 | 81.4 | 81.26 | 92.04 | 92.44 | 92.36 | 92.03 | 91.46 |
| SVHN Benchmark | | ResNet50 (21.59%) | | | | | DenseNet121 (18.88%) | | | | |
| Outlier Ratio | | 0.1 | 0.2 | 0.3 | 0.4 | 0.5 | 0.1 | 0.2 | 0.3 | 0.4 | 0.5 |
| IF | In | 50 | 100 | - | - | - | 33.33 | 100 | - | - | - |
|  | Out | 21.56 | 21.58 | 21.59 | 21.59 | 21.59 | 18.87 | 18.87 | 18.88 | 18.88 | 18.88 |
| OCSVM | In | 83.33 | 100 | 100 | - | - | 75 | 66.67 | 100 | - | - |
|  | Out | 21.55 | 21.57 | 21.58 | 21.59 | 21.59 | 18.86 | 18.87 | 18.87 | 18.88 | 18.88 |

Table 900

FIG. 9A

| MNIST Test Data | VGG16 (99.66%) | | | | |
|---|---|---|---|---|---|
| Outlier Ratio | 0.1 | 0.2 | 0.3 | 0.4 | 0.5 |
| IF In | 99.67 | 99.68 | 99.66 | 99.69 | 99.72 |
| IF Out | 99.57 | 99.59 | 99.66 | 99.62 | 99.59 |
| OCSVM In | 99.66 | 99.66 | 99.66 | 99.68 | 99.66 |
| OCSVM Out | 99.7 | 99.65 | 99.66 | 99.63 | 99.66 |
| USPS Benchmark | VGG16 (93.12%) | | | | |
| Outlier Ratio | 0.1 | 0.2 | 0.3 | 0.4 | 0.5 |
| IF In | 93.07 | 93.06 | 93.12 | 93.28 | 93.63 |
| IF Out | 93.4 | 93.29 | 93.11 | 92.91 | 92.66 |
| OCSVM In | 92.98 | 92.81 | 92.71 | 92.9 | 93.54 |
| OCSVM Out | 93.8 | 93.86 | 93.74 | 93.33 | 92.86 |
| SVHN Benchmark | VGG16 (33.69%) | | | | |
| Outlier Ratio | 0.1 | 0.2 | 0.3 | 0.4 | 0.5 |
| IF In | 60 | - | 33.69 | - | - |
| IF Out | 33.68 | 33.69 | 33.69 | 33.69 | 33.69 |
| OCSVM In | 100 | 100 | 100 | - | - |
| OCSVM Out | 33.65 | 33.68 | 33.68 | 33.69 | 33.69 |

Table 900 (continued)

FIG. 9B

DETERMINING CONFIDENT DATA SAMPLES FOR MACHINE LEARNING MODELS ON UNSEEN DATA

RELATED APPLICATIONS

This application is a continuation-in-part of U.S. patent application Ser. No. 16/366,455 filed Mar. 27, 2019 and titled "DATA-DRIVEN DEEP LEARNING MODEL GENERALIZATION ANALYSIS AND IMPROVEMENT". This application also claims priority to U.S. Provisional Application Ser. No. 62/879,155 filed Jul. 26, 2019 and titled "DETERMINING CONFIDENT DATA SAMPLES FOR DEEP NEURAL NETWORKS ON UNSEEN DATA." The entireties of the above noted applications are incorporated herein by reference.

TECHNICAL FIELD

This application generally relates to machine learning (ML) and artificial intelligence (AI), and more particularly to computer-implemented techniques for determining confident data samples for ML models on unseen data.

BACKGROUND

Artificial intelligence (AI) and machine learning (ML) is a rapidly progressing technical field impacting a wide range of industries. Advancements in machine learning technologies such as deep neural networks (DNNs) and have recently shown impressive performance, sometimes exceeding humans, in various AI domains, including computer vision, speech, natural language processing (NPL), bioinformatics, drug design, medical image analysis, and more. These achievements were made possible by significant improvement in computation power as well as the availability of massive scale annotated datasets, leading to better inferencing performance than traditional models. For example, DNN models are widely applied in biomedical image studies since DNN models take advantage of massive data to provide improved performance over ML models.

However, the data-driven nature of deep learning models leads to challenges during the inferencing stage. For example, a DNN model trained on clinical data from one hospital may not perform as well on the same type of data from another hospital. The lack of confidence in model predictions may result in poor clinical decisions, which is especially relevant in the medical diagnosis field. Accordingly, techniques for determining whether a DNN model has or will produced a confident prediction are crucial to successful integration of DNN models for real-world applications, especially with respect to unseen data (e.g., data that the DNN model was not previously exposed to during training).

In the literature, researchers have estimated DNN model confidence by quantifying the uncertainty of the model using Bayesian dropout. This approach has been applied to image segmentation to achieve improved overall segmentation accuracy when pixels with high uncertainty were dropped. Bayesian dropout has also been used to estimate prediction uncertainty in diagnosing diabetic retinopathy using fundus images. Diagnostic performance was improved when estimates of uncertainty were used to filter out samples. However, while this approach has shown promising results, it is expensive to train and requires extensive model architecture modifications.

Other recent work on classification using a filtering strategy for DNNs have been proposed to filter out instances where the base model prediction is not confident. This method uses the outputs of model softmax layer to determine a threshold to optimize sensitivity while preserving precision at given confidence level. For example, one study reported a method to measure the confidence score of unseen examples by finding the difference between output probabilities from the final softmax activation layer and the true probabilities. In this study, outlier detection was performed between popular computer vision datasets, such as a Modified National Institute of Standards and Technology (MNIST) database. However, the out-of-domain examples are visually very different from the in-domain examples used in the study. In real world applications, unseen image data received from different data sources are often visually indistinguishable.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that provide techniques for determining confident data samples for ML models on unseen data.

According to an embodiment, a system can comprise a memory that stores computer executable components and a processor that executes the computer executable components stored in the memory. The computer executable components can comprise a feature extraction component that extracts a feature vector for a data sample based on projection of the data sample onto a standard feature space. The computer executable components can further comprise an outlier detection component that processes the feature vector using an outlier detection model to determine whether the data sample is within a scope of a training dataset used to train a ML model, wherein the outlier detection model was trained using features extracted from the training dataset based on projection of data samples included in the training dataset onto the standard feature space. In various implementations, the data samples included in the training dataset that were projected onto the standard feature spaced were selected based on a determination that the ML model generated correct inferences on the data samples during training of the ML model.

In one or more implementations, outlier detection component classifies the data sample as an outlier data sample or an inlier data samples using the outlier detection model. For example, in some implementations, the outlier detection component determines a confidence score for the data sample using the outlier detection model and classifies the data sample as an outlier data sample or an inlier data sample based on the confidence score, wherein the confidence score represents a measure of confidence in the ML model to generate an accurate inference on the data sample.

In some embodiments, the computer executable components further comprise a notification component that generates an outlier detection notification for the data sample based on classification of the data sample as an outlier data sample. The computer executable components can also comprise an inferencing component that applies the ML model to the data sample to generate an inference output based on classification of the data sample as an inlier data sample. In some implementations, the computer executable components further comprise a filtering component that discards the new data sample based on a determination that the new data sample is classified as an outlier data sample. The computer executable components can also comprise a reprocessing component that sends the new data sample for manual annotation and review based on a determination that the new data sample is classified as an outlier data sample.

In some embodiments, elements described in connection with the system can be embodied in different forms such as a computer-implemented method, a computer program product, or another form.

DESCRIPTION OF THE DRAWINGS

FIGS. 9A and 9B provide a table reporting the results of experimental evaluation of the disclosed techniques as applied to the different types of the image datasets accordance with one or more embodiments of the disclosed subject matter.

DETAILED DESCRIPTION

Figure 1:
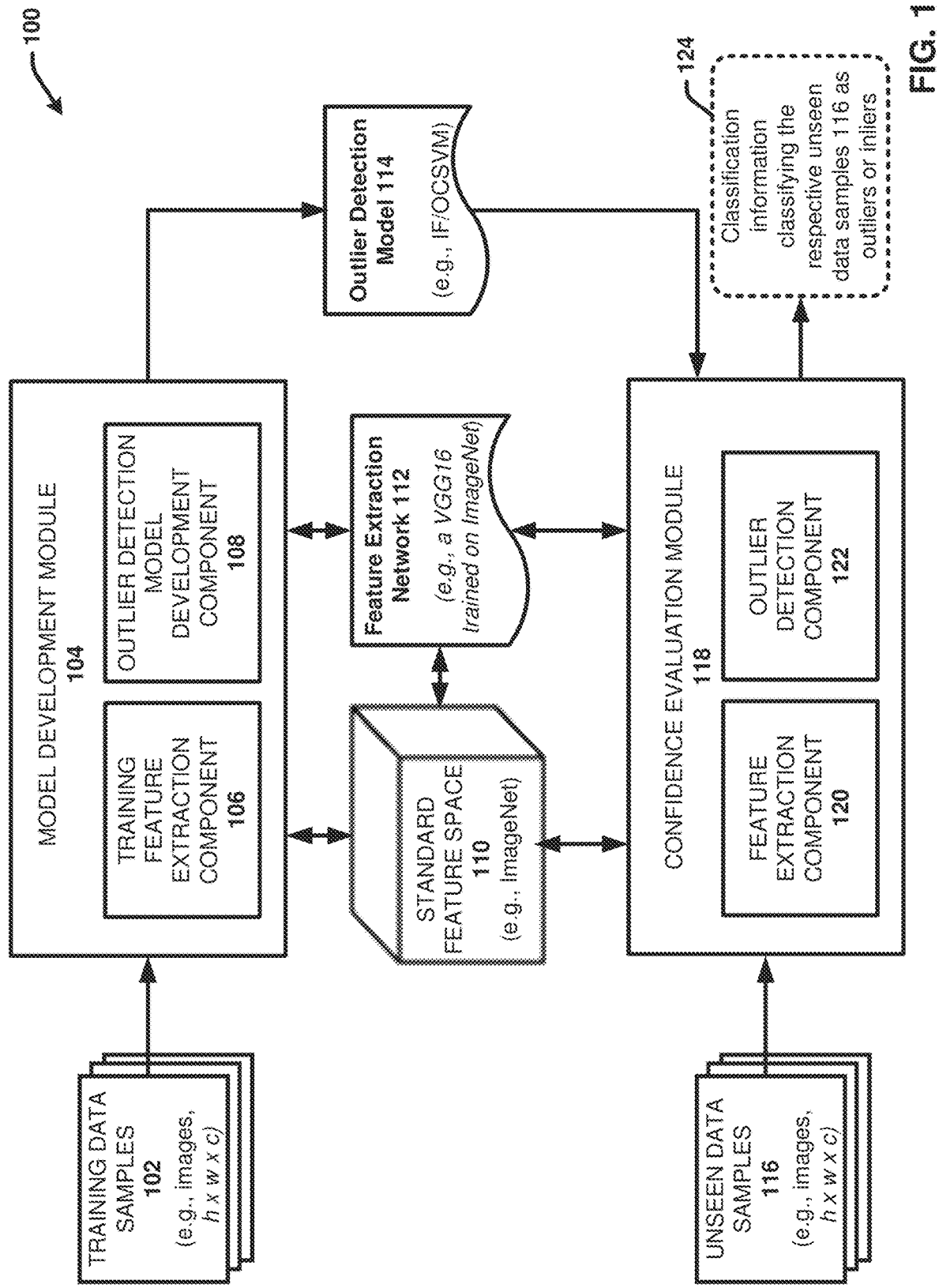
FIG. 1 illustrates a block diagram of an example, non-limiting system that facilitates determining confident data samples for ML models on unseen data in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate determining confident data samples for a ML model included in unseen data or new data. The ML model can include various types of ML models (e.g., neural network models, DNN models, convolutional neural network (CNN) models, decision tree models, support vector machine (SVM) models, regression analysis models, Bayesian network models, heuristic models, etc.) configured to perform various types of inferencing tasks (e.g., including classification tasks, segmentation tasks, detection tasks, regression tasks, and the like) in various domains. The terms "unseen" or "new" as applied to data or data samples refers to data samples that the ML model has not previously processed or evaluated during training and development. For example, an unseen or new data sample can include any data sample received in the field for potential processing by the ML model after initial training and development of the ML model has been completed. In various embodiments, the unseen or new data samples can include data samples provided by different data sources (e.g., different image sets provided by different hospitals, and the like).

As described herein, a "confident data sample," a "high confidence data sample," or the like, refers to a new or unseen data sample for which the ML model is predicted to process/evaluate with accurate performance (e.g., relative to a defined level of accuracy). In other words, application of the ML model to a "confident" or "high confidence" data sample is expected to result in an inference output by the ML model that is predicted to be accurate with a high degree of confidence (e.g., relative a threshold degree of confidence). In various embodiments, confident data samples are defined as inliers identified by an outlier detector, which is based on projection of training data onto a standard feature space (e.g., the ImageNet feature space). The disclosed techniques have demonstrated that in a standard feature space, a ML model will perform better on the inlier data samples and more poorly on the outliers.

In particular, for an unseen dataset, a ML model is expected to maintain consistent performance on data samples included in the dataset that are similar or close to training data samples. In order to compare the training data to the unseen data, the disclosed techniques measure the similarity across the two datasets by projecting correctly predicted training data samples onto a standard feature space. While projecting the unseen data to a standard feature space, if data points are detected as inliers, then the ML model is expected to demonstrate consistent performance on those inliers, as those patterns have already been "seen" from the training dataset. In this regard, the ML model is expected to have consistent performance on data samples that are similar to the training data in the standard feature space.

The standard feature space can comprise an unbiased feature space including a plurality (e.g., hundreds, thousands, millions, etc.), of annotated data samples. For example, in various embodiments, the data samples comprise images and the ML model comprises an inferencing model configured to automatically classify the images and/or features in the images. For instance, in some implementations, the ML model can be or include a medical image processing model configured to classify presence or absence of a medical condition in medical images, a state of a medical condition reflected in medical images, and the like. In accordance with these embodiments, the standard feature space can comprise a plethora (e.g., thousands, millions, etc.) of annotated images of various objects with various features, such as ImageNet. ImageNet is an open source image database organized according to the WordNet hierarchy (currently only the nouns), in which each node of the hierarchy is depicted by hundreds and thousands of images. Thus, in some embodiments, in which the ML model is configured to perform an image-based classification on image data samples, the disclosed techniques can employ the ImageNet feature space as the standard feature space (e.g., an ImageNet feature space based on the VGG16 network). However, various other standard features spaces can be utilized.

In various embodiments, to measure similarity across image datasets, the disclosed techniques project correctly predicted training data samples onto the standard feature space. An outlier detection model is then trained and built based on a standard feature space to identify the inlier data samples. Such inlier samples are considered as confident samples for the ML model as defined by the projected features from the training dataset. For example, in one or more embodiments, using a feature extractor algorithm, model or network (e.g., VGG or the like) trained based on the standard feature space, training feature vectors can be extracted for the respective training data samples in association with projection onto the standard feature space. An outlier detection model can then be developed and trained based on the training feature vectors to identify unseen data samples that are inliers relative to the training data set. In this regard, after the outlier detection model is developed and trained based on the training feature vectors, an unseen or new data samples can be individually projected onto a standard feature space to generate a feature vector for the data sample. This feature vector can further be passed through the trained outlier detector model to classify the data sample as either an outlier or an inlier. The ML model can be considered to be confident on predictions on inlier samples as those samples are expected to be similar to the training dataset. Likewise, the ML model can be expected to be non-confident on outlier data samples, and thus a prediction generated by the ML model based on outlier data sample can be considered unreliable.

It is noted that a data-driven model ML model learns common patterns from most samples within a group or class and that outlier samples are more often associated with wrong predictions. In this regard, the disclosed techniques expect the ML model to maintain consistent performance on inlier data samples when compared to the performance of the ML model on test samples from the same distribution as the training data.

Experiments were conducted to evaluate the performance of the disclosed techniques using publicly available digit image datasets and chest X-ray images from three unseen datasets collected across hospitals located in the United States and Canada. The experimental results showed consistently improved performance across various ML models on all confident samples (e.g., samples classified as inliers) from unseen datasets.

Various embodiments of the disclosed subject matter are exemplified with respect techniques for determining confident input images for processing by medical images processing models in the healthcare domain. However, it should be appreciated that the disclosed techniques are not limited to image processing models in the healthcare domain and can be applied to other domains that employ AI/ML models in various types of workflows. For example, the disclosed techniques can be employed to determine whether unseen data samples are within the scope of deployed AI/ML models used in various domains, including computer vision, speech, natural language processing (NPL), bioinformatics, drug design, medical image analysis, and more.

The term "image processing model" is used herein to refer to an AI/ML model configured to perform an image processing or analysis task on images. The image processing or analysis task can vary. In various embodiments, the image processing or analysis task can include, (but is not limited to): a segmentation task, an image reconstruction task, an object recognition task, a motion detection task, a video tracking task, an optical flow task, and the like. The image processing models described herein can include two-dimensional image processing models (2D) as well as three-dimensional (3D) image processing models. The image processing model can employ various types of AI/ML algorithms, including (but not limited to): deep learning models, neural network models, deep neural network models (DNNs), convolutional neural network models (CNNs), and the like.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output can vary based on the type of the model and the particular task that the model is configured to perform. The image-based inference output can include a data object that can be rendered (e.g., a visual data object), stored, used as input for another processing task, or the like. The terms "image-based inference output", "inference output" "inference result" "inference", "output", "predication", and the like, are used herein interchangeably unless context warrants particular distinction amongst the terms.

As used herein, a "medical imaging processing model" refers to an image processing model that is tailored to perform an image processing/analysis task on one or more medical images. For example, the medical imaging processing/analysis task can include (but is not limited to): organ segmentation, anomaly detection, anatomical feature characterization, medical image reconstruction, diagnosis, and the like. The types of medical images processed/analyzed by the medical image processing model can include images captured using various types of imaging modalities. For example, the medical images can include (but are not limited to): radiation therapy (RT) images, X-ray images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D).

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system that facilitates determining confident data samples for ML models on unseen data in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a model development module 104, a standard feature space 110, a feature extraction network 112, an outlier detection model 114, and a confidence evaluation module 118. The model development module 104, the standard feature space 110, the feature extraction network 112, the outlier detection model 114, and/or the confidence evaluation module 118 can respectively be or include machine-executable components stored in memory (not shown) associated with the one or more machines (not shown). The memory can further be operatively coupled to at least one processor (not shown), such that the components (e.g., the model development module 104, the standard feature space 110, the feature extraction network 112, the outlier detection model 114, and/or the confidence evaluation module 118), can be executed by the at least one processor to perform the operations described. Examples of said and memory and processor as well as other suitable computer or computing-based elements, can be found with reference to FIG. 12, and can be used in connection with implementing one or more of the systems or components shown and described in connection with FIG. 1 or other figures disclosed herein.

System 100 further includes training data samples 102 for input to the model development module 104 and unseen data samples 116 for processing by the confidence evaluation module 118. The training data samples 102 can include data samples that were previously used to train and/or develop a particular ML model (not shown) that resulted in correct or accurate predictions by the ML model (referred to herein as correctly predicted training samples). For example, in various embodiments, the model development module 104 (or another device or system) can select the training data samples 102 based on a determination that the training data samples resulted in correct inference results when used as input to train the ML model. The type of the training data samples 102 and the particular type and inferencing task of the ML model can vary. In various exemplary embodiments, the data training data samples 102 (and the unseen data samples 116) can comprise images and the ML model comprises an image processing model. For instance, in some embodiments, the training data samples 102 and the unseen data samples 116 can be medical images and the ML model can be a medical image processing model configured to classify presence or absence of a medical condition in the medical images, classify a state of a medical condition reflected in the medical images, and the like.

The unseen data samples 116 (also referred to herein as "new" data samples) can include new data samples that the ML model has not previously processed or evaluated during training and development. In various embodiments, the unseen data samples 116 can include data samples provided by different data sources (e.g., different image sets provided by different hospitals, and the like). For example, the new or unseen data samples 116 can include any data sample received in the field for potential processing by the ML model after initial training and development of the ML model has been completed. However, it should be appreciated that the unseen data samples 116 and the training data samples 102 generally comprise a same type of data sample that the ML model is configured to process. For example, if the ML model is trained to generate inferences on chest X-ray images, both the training data samples 102 and the unseen data samples 116 can include chest X-ray images.

Although the unseen data samples 116 generally include data samples of the same type as the training data samples 102, in practice it is likely that some of the unseen data samples 116 will be outside the scope of the distribution of the training data samples 116 (e.g., especially when the unseen data samples 116 are received from a different data source relative to the data source that provided the training data samples 102). Such data samples that are outside the scope of the training data samples 102 are referred to herein as outlier data samples (or simply "outliers"). The performance accuracy of the ML model on these outlier data samples is generally unpredictable and/or low (e.g., relative to a defined accuracy threshold). For example, a ML model trained on clinical data from one hospital may not perform as well on the same type of data from another hospital. This lack of confidence in model predictions may result in poor clinical decisions, which is especially relevant in the medical diagnosis field.

In one or more embodiments the model development module 104 can be configured to receive and processes the training data samples 102 to develop and/or train an outlier detection model 114 to classify the respective unseen data samples 116 as either inlier data samples or outlier data samples prior to processing by the ML model. As noted above, inlier data samples correspond to data samples that are predicted to be inside the scope of the (correctly predicted) training data samples 102, and thus are considered confident or high confidence data samples. Likewise, outlier data samples correspond to data samples that are predicted to be outside the scope of the training data samples, and thus considered data samples without confidence or otherwise low confidence data samples.

After the outlier detection model 114 has been developed and trained, the confidence evaluation module 118 can employ the outlier detection model 114 to evaluate unseen data samples 116 prior to processing by the ML model to classify the unseen data samples 116 as either inliers or outliers. As a result, the confidence evaluation module 118 can facilitate identifying new data samples that the ML model is expected to generate accurate and inaccurate inferences on prior to input into the ML model. The confidence evaluation module 118 can further facilitate improving the model performance by feeding the ML model the inlier/high confidence data samples and filtering out the outlier/low confidence data samples. Likewise, the confidence evaluation module 118 can facilitate identifying low confidence data samples included in the unseen data samples 116 and extracting these low confidence data samples for further model training and updating to expand the scope of the ML model. For example, as applied medical image processing ML models, the confidence evaluation module 118 can facilitate finding new images included in the unseen data samples 116 that were not included in or well represented in the training data used to train the image processing model. The confidence evaluation module 118 can further select these outlier images for manual annotation and usage in further model training and updating using supervised or semi-supervised ML techniques. This can help clinicians prioritize and allocate more resources to cases where the ML model is not confident. For example, the confidence evaluation module 118 can facilitate sending the outlier/low confidence data samples for additional review and/or annotation using scrutinized annotation techniques (e g, manual annotation by one or more expert entities). The new, annotated data samples can further be added to the training data set and used to further train and update the ML model.

In various embodiments, the outlier detection model 114 employs an outlier detection method that is based on comparing the features of the unseen data samples 116 to features of the training data samples 102 based on projection of both data sets onto a standard feature space 110. In particular, the outlier detection model 114 can be trained based on features extracted from the training data samples 102 as projected onto the standard feature space 110. Once trained, an unseen data sample (included in the unseen data samples 116) can then be projected onto the (same) standard feature space 110 and features (represented by a feature vector) for the unseen data sample can be extracted for the unseen data sample based on projection of the unseen data same onto the standard feature space. These extracted features can further be processed by the outlier detection model 114 to determine whether the unseen data sample is within the scope of the training data samples 102 (e.g., an outlier or inlier).

In this regard, the standard feature space 110 can comprise an unbiased feature space including a plurality (e.g., hundreds, thousands, millions, etc.) of annotated data samples of the same type or category as the training data samples 102. For example, in embodiments wherein the training data samples 102 comprise images and the ML model comprises an image processing model, the standard feature space can comprise a plethora (e.g., thousands, millions, etc.) of annotated images of various objects with various features. In accordance with this example, the standard feature space 110 can be or correspond to ImageNet. However, various other standard features spaces can be utilized and will vary based on the type of the training data samples 102 and the inferencing task the ML model. ImageNet is an open source image dataset organized according to the WordNet hierarchy. Each meaningful concept in WordNet, possibly described by multiple words or word phrases, is called a "synonym set" or "synset". There are more than 100,000 synsets in WordNet, majority of them are nouns (80,000+) ImageNet provides on average 1000 images to illustrate each synset Images of each concept are quality-controlled and human-annotated. In its completion, ImageNet will offer tens of millions of cleanly sorted images for most of the concepts in the WordNet hierarchy.

In the embodiment shown, the model development module 104 includes a training feature extraction component 106 and an outlier detection model development component 108 to facilitate training and developing the outlier detection model 114. In one or more embodiments, to construct (e.g., train and develop) the outlier detection model 116, the training feature extraction component 106 projects the training data samples 102 onto the standard features space 110. The training feature extraction component 106 further extracts training feature vectors for the training data samples 102 as projected onto the standard features space 110 using a feature extraction network 112 (e.g., a neural network-based feature extraction model or another statistical or machine learning based feature extraction model). The extracted training feature vectors correspond to sets of data points representative of the respective training data samples. This standard feature space projection-based feature extraction technique provides an unbiased comparison between the different data sets because the standard feature space is representative of a various data samples provided by third party systems (e.g., ImageNet or the like) with no influence by the model training and development.

In various implementations, the feature extraction network 112 can include a pre-trained feature extraction network that was trained on the standard feature space 110. For example, in one or more embodiments, the feature extraction network 116 can include a neural network extractor such a visual geometry group (VGG) network, an Inception network, a ResNet network, a DenseNet network, or the like that was pre-trained on the ImageNet feature space. In other embodiments, the feature extraction network can include a VGG network, an Inception network, or another suitable neural network feature extraction model that was not pre-trained on the standard feature space 110. With these embodiments, the model development module 104 can train and develop the feature extraction network 112 on the standard feature space 110.

The outlier detection model development component 108 further employs the extracted training feature vectors to train and develop the outlier detection model 114. For example, in some embodiments, the outlier detection model development component 108 can employ the training feature vectors to train and develop an outlier detection model 114 to classify a new data sample as either an outlier data sample or an inlier data sample using a defined outlier ratio (e.g., 0.1, 0.2, 0.3, 0.4, or 0.5). In other embodiments, the outlier detection model 114 can be configured to generate a confidence score for a data sample that represents a degree of confidence in the ML model to generate an accurate inference output/result based on the data sample. Defined confidence sore criteria can further be used to classify data samples as either outlier or inliers. For example, the confidence score criteria can consider data samples with confidence scores greater than a defined threshold as inliers, while those with confidence scores less than or equal to the defined threshold are outliers.

In some embodiments, the outlier detection model 114 can classify data samples into inliers and outliers by inexplicitly measuring the distance between individual cases from an unseen data sample and the training dataset (e.g., one data sample compared against the entirety of the training data samples). In this regard, one suitable outlier detection method that can be employed by the outlier detection model 114 to detect inliers and outliers from unseen data against the training data set (e.g., including the collection of the training data samples 102) can include the isolation forest (IF) outlier detection method. The isolation forest (IF) method is a powerful unsupervised ensemble method for outlier detection based on decision trees. The averaged random tree path length determines whether a data point is an inlier or an outlier. Another suitable outlier detection method that can be employed by the outlier detection model 114 to detect inliers and outliers from unseen data against the training data set (e.g., including the collection of the training data samples 102) can include the one-class support vector machine (OCSVM) method. The OCSVM method identifies the smallest hypersphere consisting of all the data. Data points that fall inside the hypersphere are considered to be inliers, whereas data points outside the hypersphere are considered to be outliers. In some embodiments, the outlier detection model 114 can employ both the IF algorithm and the OCSVM algorithm to detect inliers and outliers from unseen data against the training data set.

It is noted that, the Fréchet Inception Distance (FID) outlier detection method and the Inception Score (IS) outlier detection method both explicitly measure the distribution similarity between two image sets. However, a large number of images, on the order of thousands of samples, is required to accurately estimate the similarity measurement using either of these methods. In this regard, because various embodiments of the disclosed techniques are directed to employing the outlier detection model 114 to individual evaluate each unseen data sample (e.g., one at a time) to identify the similarity of each individual unseen data samples against the collection of training data samples, IS and/or FID cannot be applied here.

In this regard, once the outlier detection model 114 has been trained and developed by the model development module 104, the confidence evaluation module 118 can employ the outlier detection model 114 to distinguish between those unseen data samples 116 that are characterized as being high confidence data samples, and those unseen data samples 116 that are classified as being low confidence data samples. The confidence evaluation module 118 can include feature extraction component 120 and outlier detection component 122 to facilitate this confidence evaluation process. As noted above, the confidence evaluation process involves evaluating the confidence of the ML model in each (or some) of the unseen data samples 116 individually. In this regard, for each new or unseen data sample, the feature extraction component 120 can first project the new data sample onto the standard feature space 110 and extract a single feature vector for the new data sample using the feature extraction network 112. Thus, similar to the training feature extraction component 106, the feature extraction component 120 can also employ the feature extraction network 112 to extract a feature vector for a new data sample based on projection of the new data sample onto the standard feature space 110. The outlier detection component 122 can then employ the outlier detection model 114 to determine whether the new data sample is classified as an outlier data sample (e.g., outside the scope of the training data set) or an inlier data sample based on the feature vector (e.g., inside the scope of the training data set). For example, using an IF and/or an OCSVM method, the outlier detection model 114 can compare the feature vector against the training feature vectors to determine whether the feature vector and thus the corresponding new data sample is an outlier or an inlier using a defined outlier ratio. In another embodiment, the outlier detection model 114 can generate a confidence score for the data sample that reflects a measure of confidence in the ML model to generate an accurate inference result based on the data sample. The outlier detection component 122 can further generation classification information 124 for the new data sample based on the results of the outlier detection model 114. For example, the classification information 124 can identify or otherwise classify the respective unseen data samples 116 as outliers or inliers based on the outlier ratio determined for the data sample and defined outlier ratio criterion for inliers and outliers. In another example, the classification information 124 can provide confidence scores determined for the respective data samples and/or classify the respective data samples as outliers or inliers based on their confidence scores and defined confidence score criteria for outliers and inliers.

Figure 2:
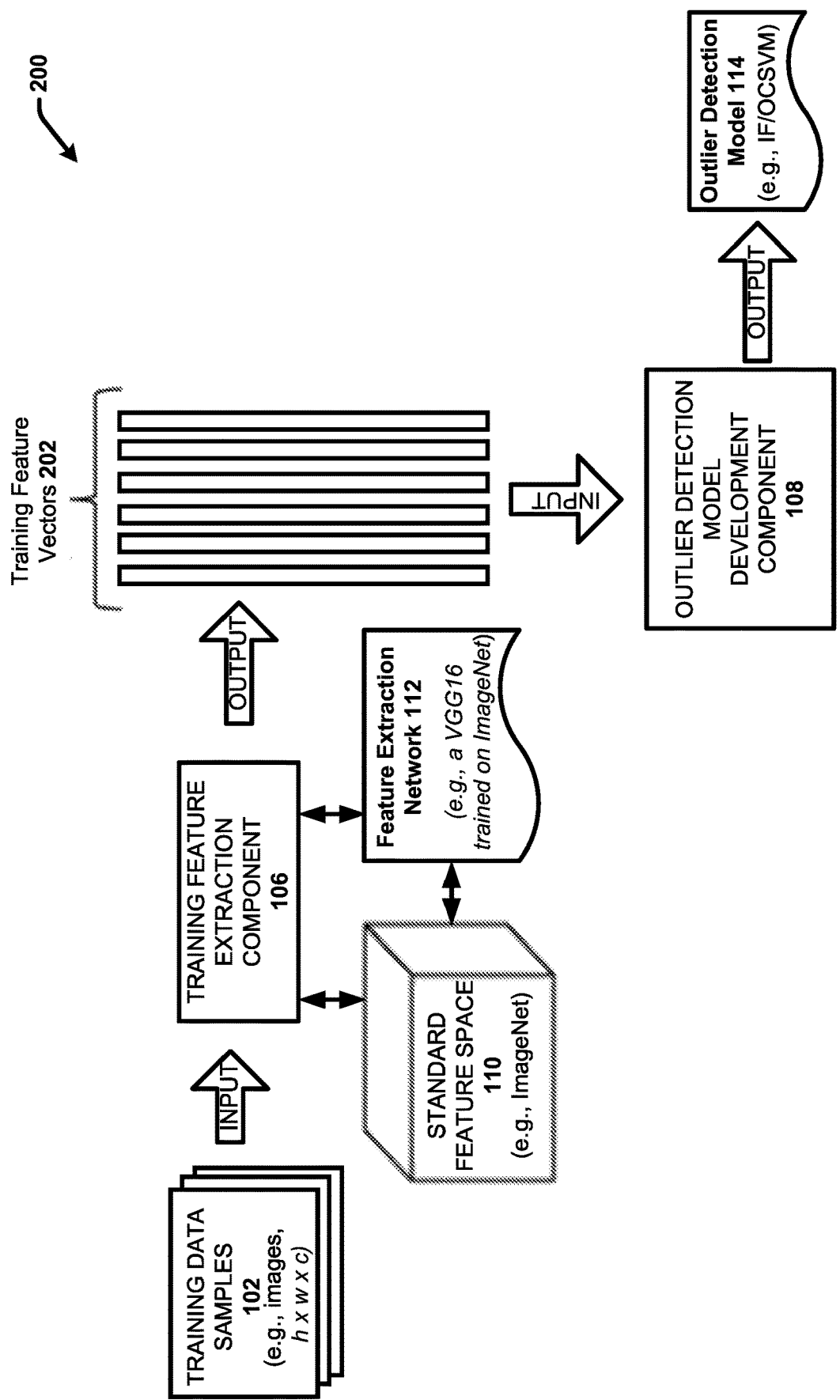
FIG. 2 provides an illustration of an example method for generating an outlier detection model that facilitates determining confident data samples for ML models on unseen data in accordance with one or more embodiments of the disclosed subject matter.

FIG. 2 provides an illustration of an example method 200 for generating an outlier detection model (e.g., outlier detection model 114) that facilitates determining confident data samples for ML models on unseen data in accordance with one or more embodiments of the disclosed subject matter. In this regard, method 200 demonstrates the model training and development element of system 100 provided by the model development module 104 of system 100 in accordance with one or more embodiments. Repetitive description of like elements employed in respective embodiments is omitted for sake of brevity.

In accordance with method 200, the training feature extraction component 106 can receive or otherwise retrieve the training data samples 102 used to train a particular ML model. In various embodiments, the training data samples 102 can comprise only those data samples included in a training dataset used to train the ML model that the ML model generated accurate/correct inferences on. Additionally, or alternatively, the training data samples 102 can comprise a randomly selected subset of the training dataset, a subset of the training dataset selected based on another criterion, and/or the entire training dataset.

The feature extraction component 106 further employs the standard feature space 110 and the feature extraction network 112 to extract training feature vectors 202 for the respective training data samples 102. For example, in one or more embodiments in which the training data samples 102 comprise images, the training feature extraction component 106 can project the training data samples 102 onto a standard image feature space (e.g., ImageNet) and employ a feature extraction network 112 (e.g., a VGG network, an Inception network, a ResNet network, or the like), trained on the standard image feature space to extract the training feature vectors 202. In some implementations, the training feature extraction component 106 can use an ImageNet pre-trained VGG16 network to build the standard feature space 110. The extracted training feature vectors 202 are the used as input to the outlier detection model development component 108 to train and develop the outlier detection model 114 (e.g., an IF based outlier detector, an OCSVM outlier detector, or the like).

Figure 3:
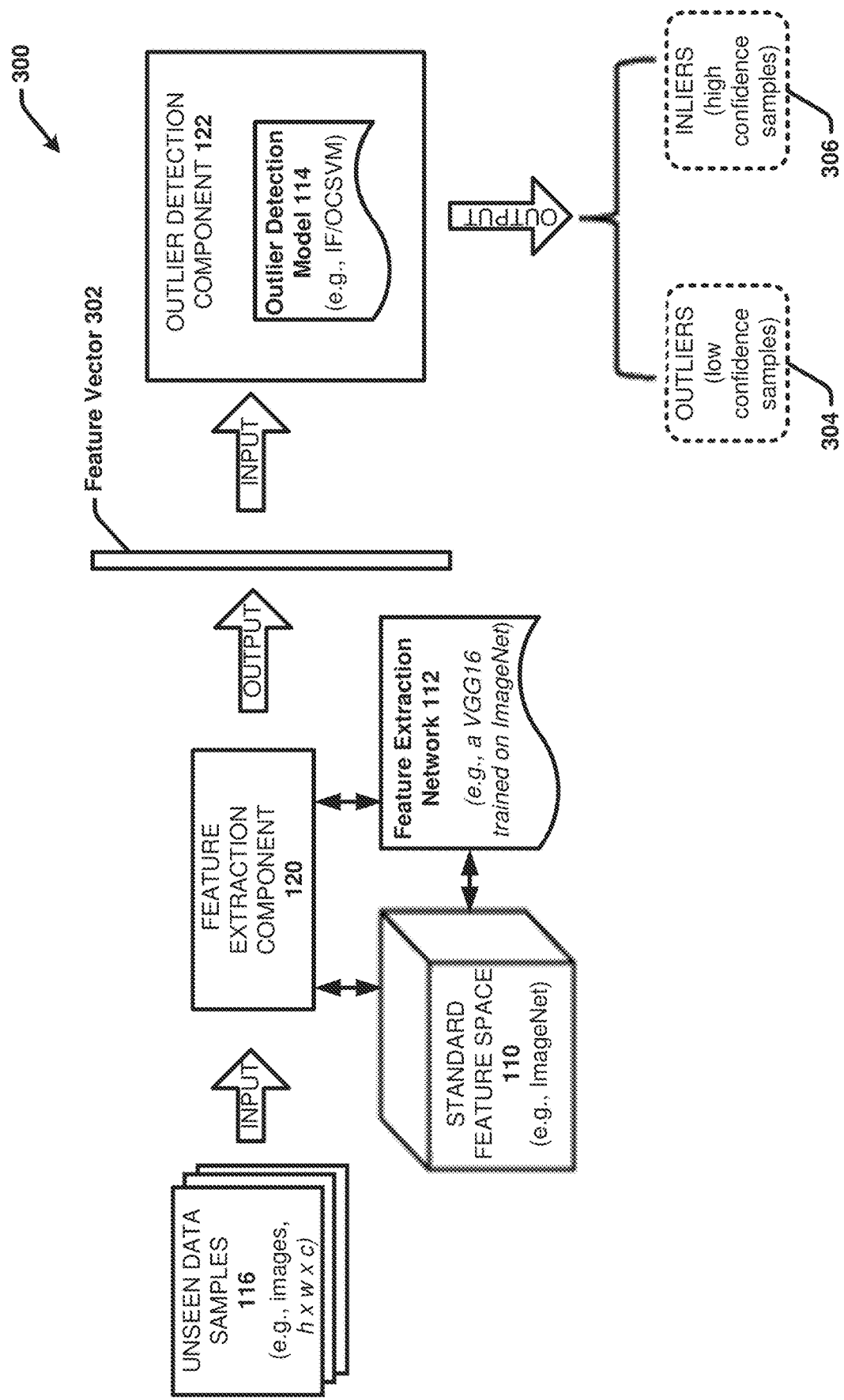
FIG. 3 provides an illustration of an example method for determining confident data samples for ML models on unseen data using an outlier detection model data in accordance with one or more embodiments of the disclosed subject matter.

FIG. 3 provides an illustration of an example method 300 for determining confident data samples for ML models on unseen data using the outlier detection model 114 developed in accordance with process 200. In this regard, method 300 demonstrates the features and functionalities of the confidence evaluation module 118 of system 100 in accordance with one or more embodiments. Repetitive description of like elements employed in respective embodiments is omitted for sake of brevity.

In accordance with method 300, the feature extraction component 120 can receive or otherwise retrieve unseen data samples 116. Processing each of the unseen data samples individually, the feature extraction component 120 can employ the standard feature space 110 and the feature extraction network 112 to extract a feature vector 302 for each unseen data sample. In particular, using the feature extraction network 112, the feature extraction component 120 can extract the feature vector 302 for each unseen data sample based on projection of the unseen data onto the standard feature space 110. For example, in one or more embodiments, the in which the training data samples 102 and the unseen data samples 116 comprise images, the feature extraction component 120 can project each unseen data sample onto a standard image feature space (e.g., ImageNet) and employ a VGG network, an Inception network, a ResNet network, or the like, trained on the standard image feature space to extract a feature vector 302 for each unseen image.

The outlier detection component 122 can further apply the feature vector 302 as input to the outlier detection model 114 to determine whether the respective unseen data samples 122 are outside the scope of the training data 102 and/or the ML model and thus considered outliers 304 or inside the scope of the training data and/or the ML model and thus inliers 306. For example, in some embodiments, the outlier detection model 114 can be configured to generate an outlier ratio value for each data sample that reflects its degree of correspondence to the training data samples 102. With these embodiments, the outlier detection component 122 can determine whether a data sample is an outlier or an inlier based on defined outlier ratio criteria. For example, the outlier detection component 122 can be configured to classify a data sample as an outlier if its' outlier ratio meets a first defined criterion and/or classify data the data sample as an inlier if its' outlier ratio meets a second defined criterion. In another embodiment, the outlier detection model 114 can be configured to generate a confidence score for a data sample that reflects a measure of confidence in the ML model to accurately inference on the data sample. With this embodiment, the outlier detection component 122 can classify data samples with low confidence scores (e.g. relative to a defined confidence score threshold) as outliers 304 and data samples with high confidence scores (e.g., relative a defined threshold) as inliers 306.

Figure 4:
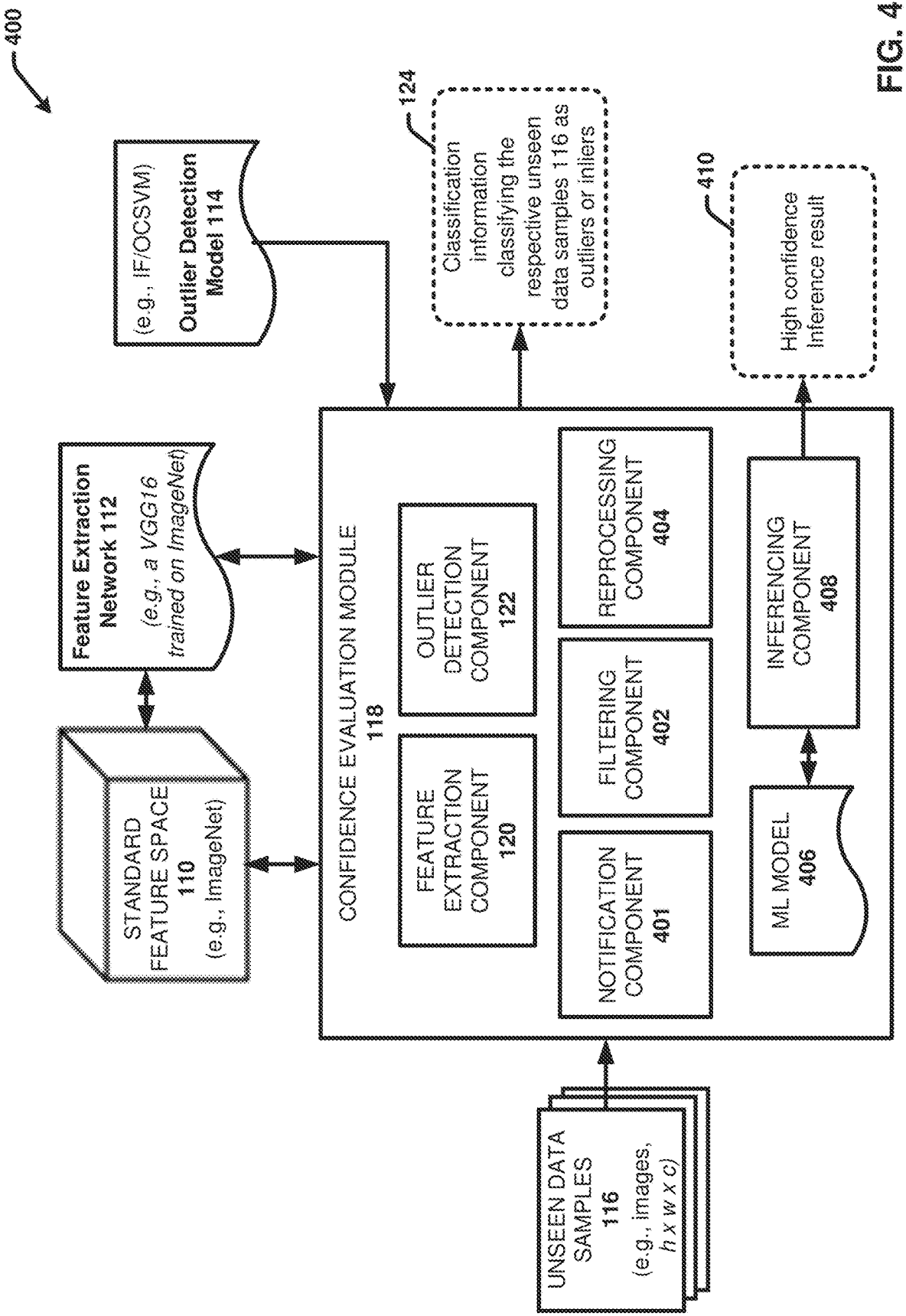
FIG. 4 illustrates a block diagram of an example, non-limiting system that facilitates regulating and optimizing the performance of ML models based the detected confidence level in unseen data in accordance with one or more embodiments of the disclosed subject matter.

FIG. 4 illustrates a block diagram of an example, non-limiting system 400 that facilitates regulating and optimizing the performance of ML models based the detected confidence level in unseen data in accordance with one or more embodiments of the disclosed subject matter. In one or more embodiments, system 100 can include system 400, or vice versa. Repetitive description of like elements employed in respective embodiments is omitted for sake of brevity.

In the embodiment shown, the confidence evaluation module 118 can further include a notification component 401, a filtering component 402, a reprocessing component 404, a ML model 406 (e.g., that is or corresponds to the ML model for which the confidence in the unseen data samples is being evaluated), and an inferencing component 408.

In some embodiments, the notification component 401 can generate an outlier detection notification for an unseen data sample based on classification of the unseen data sample as an outlier (e.g., by the outlier detection component 122). The outlier detection notification can be presented to an end user prior to processing and/or after processing of the outlier data sample by the ML model 406 and serve to notify the end user that the confidence in the ML model's inferencing accuracy on the data sample is low. In some implementations, the outlier detection notification can include information that classifies the data sample as an outlier. In other implementations, the outlier detection notification can also include a particular outlier ratio and/or confidence score determined for the data sample that resulted in classification of the data sample as an outlier.

In some implementations, the filtering component 402 can discard new or unseen data samples that are classified by the outlier detection component 122 as outliers. In this regard, the filtering component 402 can facilitate preventing application of the ML model 406 to outlier data samples that will likely result in low confidence inference predictions. In other embodiments, the reprocessing component 404 can send outlier data sample for manual annotation and review. With respect to medical image analysis ML models, this can help clinicians prioritize and allocate more resources to data samples where the ML model is not confident. For example, the reprocessing component 404 can facilitate sending the outlier/low confidence data samples for additional review and/or annotation using scrutinized annotation techniques (e.g., manual annotation by one or more expert entities). The newly annotated data samples can further be added to the training data set and used to further train and update the ML model 406.

The inferencing component 408 can apply the ML model 406 to one or more of the unseen data samples 116 to generate inference results/outputs based. In some embodiments, the inferencing component 408 can be configured to automatically and/or (only) apply the ML model 406 to new or unseen data samples that are classified as inliers to generate an inference result 410 that is predicted to be a high confidence inference result (e.g., associated with a high degree of confidence that the inference generated by the ML model is accurate).

Figure 5:
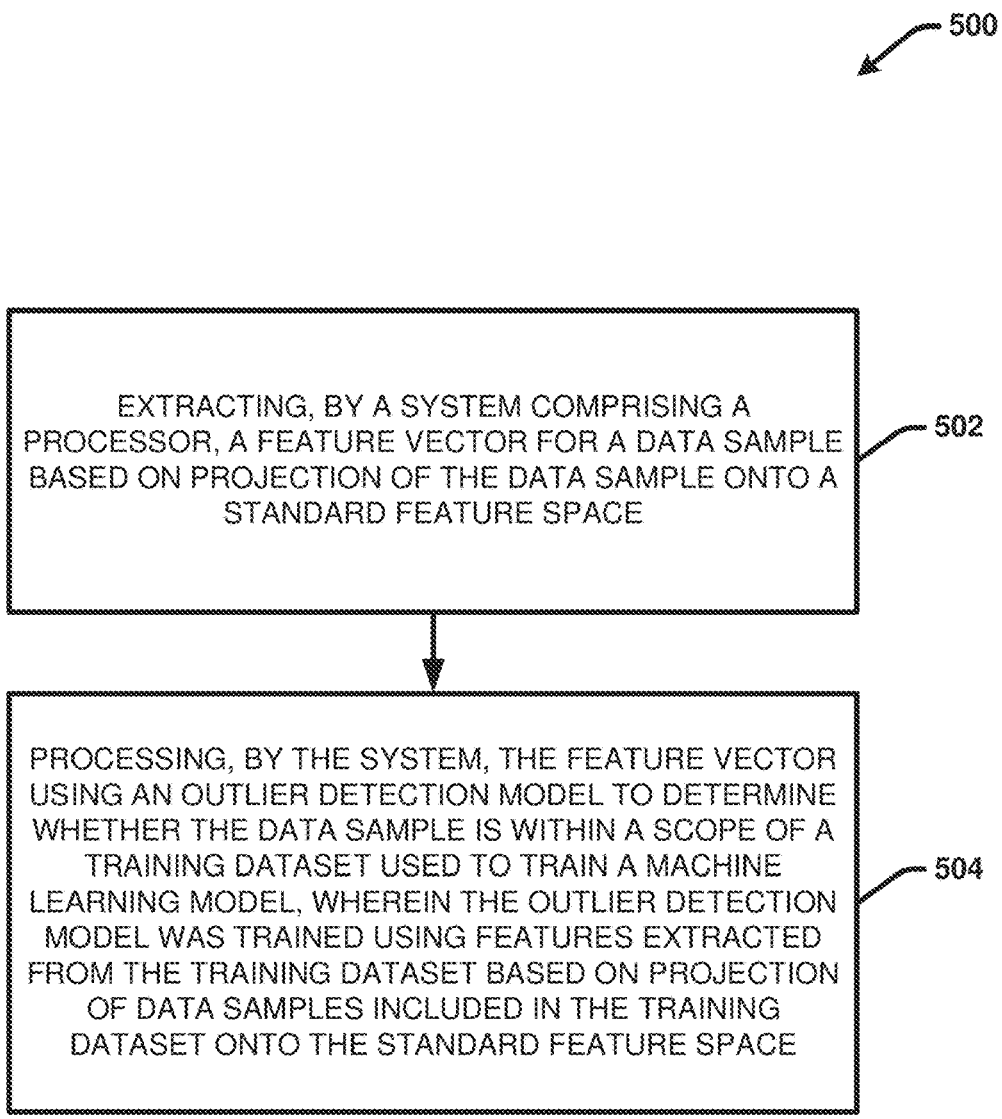
FIG. 5 illustrates a flow diagram of an example, non-limiting process for determining confident data samples for a ML model on unseen data in accordance with one or more embodiments of the disclosed subject matter.

FIG. 5 illustrates a flow diagram of an example, non-limiting process 500 for determining confident data samples for ML models on unseen data in accordance with one or more embodiments of the disclosed subject matter. Repetitive description of like elements employed in respective embodiments is omitted for sake of brevity At 502, a system comprising a processor (e.g., system 100, system 400 or the like) can extract (e.g., using feature extraction component 120) a feature vector for a data sample (e.g., an unseen data sample included in the unseen data samples 116) based on projection of the data sample onto a standard feature space (e.g., standard feature space 110). At 504, the system, can process the feature vector (e.g., using outlier detection component 122) using an outlier detection model (e.g., outlier detection model 114) to determine whether the data sample is within a scope of a training dataset (e.g., training data samples 102) used to train a ML model (e.g., ML model 406), wherein the outlier detection model was trained using features extracted from the training dataset based on projection of data samples included in the training dataset onto the standard feature space.

Figure 6:
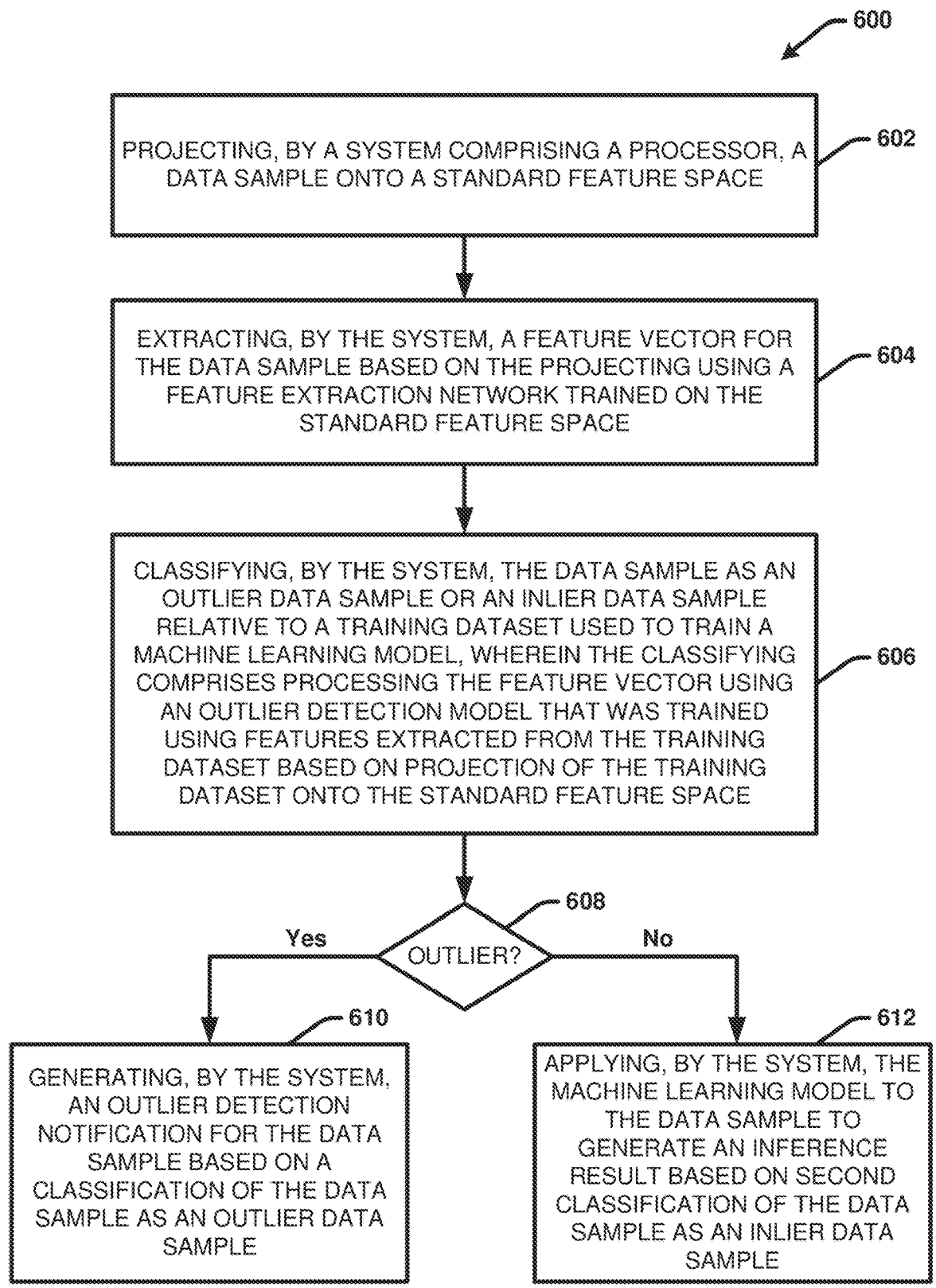
FIG. 6 illustrates a flow diagram of another example, non-limiting process for determining confident data samples for ML models on unseen data in accordance with one or more embodiments of the disclosed subject matter.

FIG. 6 illustrates a flow diagram of another example, non-limiting process 600 for determining confident data samples for ML models on unseen data in accordance with one or more embodiments of the disclosed subject matter. Repetitive description of like elements employed in respective embodiments is omitted for sake of brevity.

At 602, a system comprising a processor (e.g., system 100, system 400 or the like) can project (e.g., using feature extraction component 120) a data sample (e.g., an unseen data sample included in the unseen data samples 116) onto a standard feature space (e.g., standard feature space 110). At 604, the system can extract (e.g., using feature extraction component 120) a feature vector for the data sample based on the projecting using a feature extraction network trained (e.g., feature extraction network 112) on the standard feature space. At 606, the system can classify (e.g., using outlier detection component 122) the data sample as an outlier data sample or an inlier data sample relative to a training dataset (e.g., training data samples 102) used to train a ML model (e.g., ML model 406) wherein the classifying comprises processing the feature vector using an outlier detection model (e.g., outlier detection model 114) that was trained using features extracted from the training dataset based on projection of the training dataset onto the standard feature space. At 608, the system can evaluate the classification determined for the data sample to determine whether the data sample was classified as an outlier or an inlier (e.g., using outlier detection component 122). At 610, the system can generate (e.g., using notification component 401) an outlier detection notification for the data sample based on a classification of the data sample as an outlier data sample. In some implementations, the system can further collect the outlier data samples and employ the outlier data samples for retraining and updating the ML model to expand the scope of the ML model. The system can also send the outlier data samples for manual annotation/review to facilitate using the outlier data samples in association with training and updating the ML model in accordance with supervised and/or semi-supervised machine leaning techniques. At 612, the system can apply (e.g., using inferencing component 408) the ML model to the data sample to generate an inference result (e.g., high confidence inference result 410) based on classification of the data sample as an inlier data sample.

Figure 7:
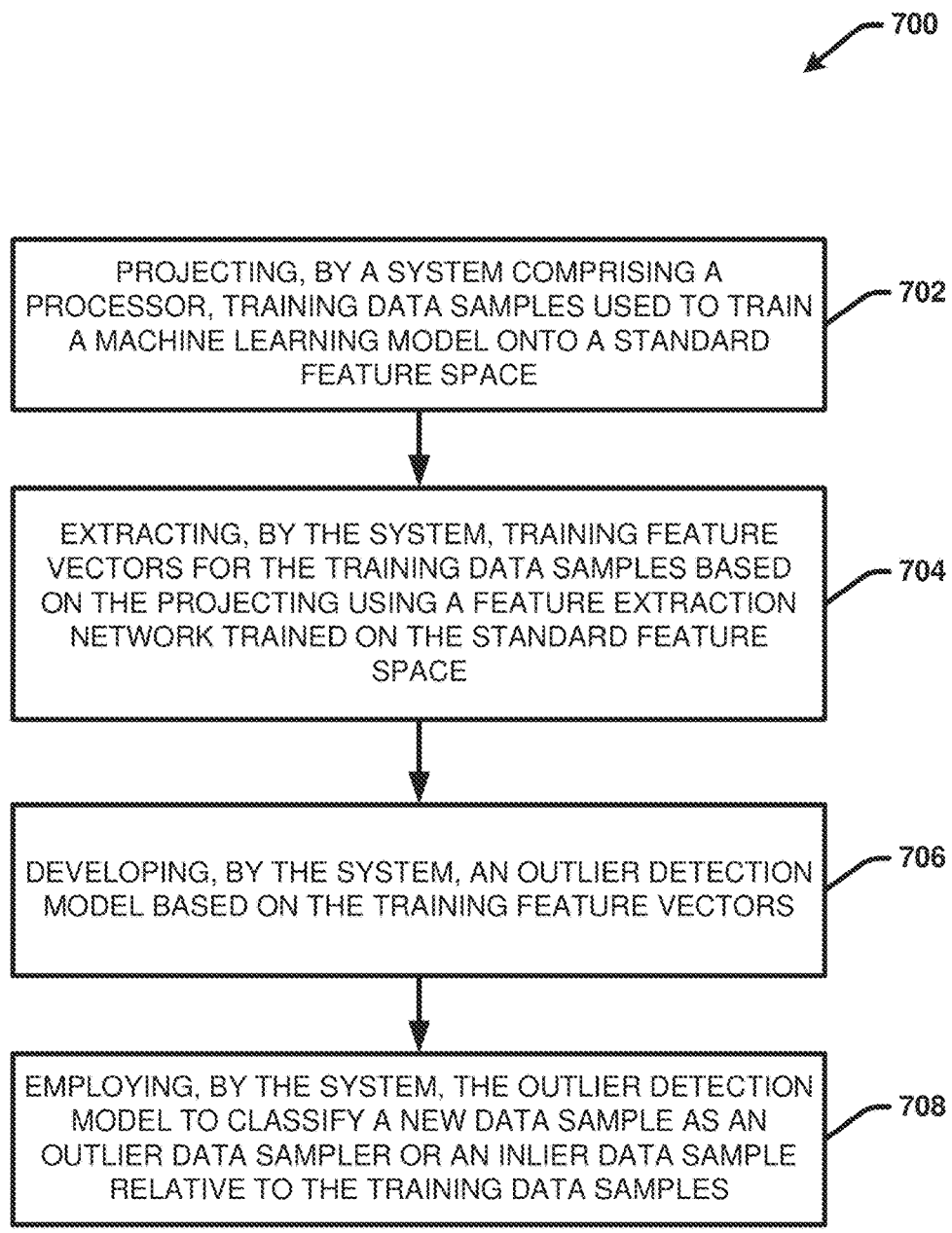
FIG. 7 illustrates a flow diagram of an example, non-limiting process for generating an outlier detection model that facilitates determining confident data samples for ML models on unseen data in accordance with one or more embodiments of the disclosed subject matter.

FIG. 7 illustrates a flow diagram of an example, non-limiting process 700 for generating an outlier detection model that facilitates determining confident data samples for ML models on unseen data in accordance with one or more embodiments of the disclosed subject matter. Repetitive description of like elements employed in respective embodiments is omitted for sake of brevity.

At 702, system comprising a processor (e.g., system 100, system 400 or the like), can project (e.g., using training feature extraction component 106) training data samples (e.g., training data samples 102) used to train a ML model (e.g., ML model 406) onto a standard feature space (e.g., standard feature space 110). At 704, the system can extract (e.g., using training feature extraction component 106) training feature vectors (e.g., training feature vectors 202) for the training data samples based on projection of the training data samples onto the standard feature space. At 706, the system can develop an outlier detection model (e.g., outlier detection model 114) based on the training feature vectors (e.g., using outlier model development component 108). At 708, the system can employ the outlier detection model to classify a new data sample as an outlier data sampler or an inlier data sample relative to the training data samples (e.g., using the outlier detection component 122).

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Experimental Evaluation of the Disclosed Techniques for Determining Confident Data Samples As described with reference to FIGS. 1-7, the disclosed subject matter provides innovative techniques to identify confident data samples from unseen data that on which a ML model will have better performance in terms of accuracy relative low confidence data samples included in the unseen data. In this regard, confident samples are defined as inliers identified by an outlier detection model (e.g., outlier detection model 114), which is based on projection of training data onto a standard feature space (e.g. ImageNet feature space). Unseen data samples are further projected onto the standard feature space and passed through the outlier detector to classify the respective unseen data samples as outliers or inliers. The inlier data samples are considered as confident samples for the ML model as defined by the projected features from the training dataset. In this regard, the ML model is considered to be confident on predictions on inlier samples as those samples are expected to be similar to the training dataset. The hypothesis of the proposed method is that in a standard feature space, a ML model will perform better on the inlier data samples relative to the outlier data samples.

To validate this hypothesis, two sets of experiments were conducted on the MNIST classification and National Institute of Health (NIH) chest X-ray lung field classification tasks. To address these classification tasks, state of the art DNN models including VGG16, Res-Net50 and DenseNet121 networks were retrained on the training datasets. The Res-Net50, DenseNet121 and VGG16 models were initialized with pre-trained ImageNet weights. In each case, the training process followed a standard training process with both horizontal and vertical random flipping augmentation during training. The Adam optimizer with a default learning rate of 0.001 was used during training. After the DNN models were trained and tested, the correctly predicted images from the training dataset were projected onto the standard feature space to extract the training feature vectors (e.g., as described with reference to the training feature extraction component 106). The ImageNet feature space was used as the standard feature space. Outlier detection models (e.g., outlier detection model 114) using IF and OCSVM methods were respectively constructed with the extracted training features vectors (e.g., as described with reference to the outlier detection model development component 108). The outlier detection models were then used to remove outliers in unseen data samples. Outlier ratios of 0.1, 0.2, 0.3, 0.4 and 0.5 were selected. The remaining samples with outlier ratios above 0.5 were classified as inlier data samples. Other settings of the IF and OCSVM based outlier detection models were based on default settings from the Python Scikit-Learn package. These experiments and their results are now described with reference to FIGS. 8-11.

Figure 8:
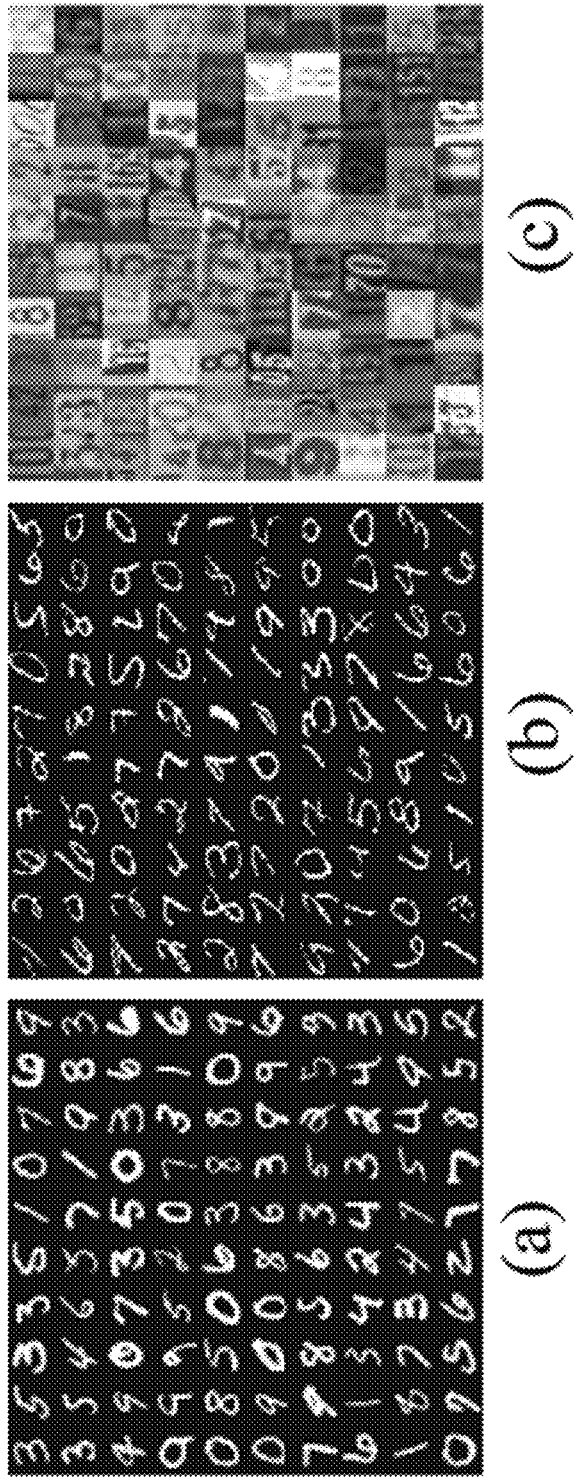
FIG. 8 presents samples from different types of digit image datasets used in experimental evaluation of the disclosed techniques for determining confident data samples for ML models on unseen data in accordance with one or more embodiments of the disclosed subject matter.

With reference to FIG. 8, presented are samples from different types of digit image datasets used in a first experimental evaluation of the disclosed techniques for determining confident data samples for DNNs on unseen data in accordance with one or more embodiments of the disclosed subject matter. The first experimental evaluation evaluated the MINST classification task using MINST handwritten digits as the training data with the United States Postal Service (USPS) and Street View House Number (SVHN) digit datasets as the "unseen" test data. In the embodiment shown, dataset (a) provides samples images from the MINST training dataset, dataset (b) provides sample images from the USPS dataset, and sample (c) provides samples images from the SVHN dataset.

MNIST classification is a classical machine learning task that classifies handwritten digit images into 10 classes (numbers 0 to 9). In according with this experiment, different MNIST classification models were trained based on VGG16, ResNet50 and DenseNet121 networks. Each of these classification models were then evaluated separately on the MNIST training dataset, and the USPS and SVHN test datasets. As shown in FIG. 8, the USPS dataset is more visually similar to the MNIST dataset while the SVHN dataset is very different from the MINST and USPS datasets.

FIGS. 9A and 9B provide a Table 900 reporting the results of MINST classification task experimental evaluation. The results reported in Table 900 indicate that the models trained on MNSIT dataset performed reasonably well on USPS data but performed poorly on SVHN dataset.

The performance of the different MINST classification models was benchmarked on unseen data. Benchmark accuracy is defined as the classification accuracy of the retrained DNN model on the entire unseen dataset before outlier detection. As shown in Table 9, the model performance dropped substantially on the unseen USPS and SVHN datasets when compared to the MNIST test dataset. For the ResNet50 model, the accuracy dropped by 16.23% and 77.94% from the MNIST dataset to the USPS and SVHN datasets, respectively. For DenseNet121, the accuracy dropped by 8.18% and 80.79% from MNIST dataset to the USPS and SVHN datasets, respectively. For VGG16, the accuracy dropped by 6.54% and 65.97% from MNIST dataset to the USPS and SVHN datasets, respectively. This reduction in model performance indicates a failure to generalize to unseen data.

With respect to the inliers, Table 9 show that model performance generally improved on confident samples (inliers) when using both IF and OCSVM outlier detectors across different outlier ratios. For the IF outlier detector when compared to benchmark, ResNet50 accuracy improved from 83.30% up to 85.87% on USPS data and 21.59% up to 100% on SVHN data. Dense-Net121 accuracy improved from 91.49% up to 92.34% on USPS data and from 18.88% up to 100% on SVHN data. VGG16 accuracy improved from 93.12% up to 93.63% on USPS data and from 33.69% up to 60% on SVHN data. Similarly, for the OCSVM detector, ResNet50 accuracy improved from 83.30% up to 86.59% on USPS data and 21.59% up to 100% on SVHN data. DenseNet121 accuracy improved from 91.49% up to 91.54% on USPS data and 18.88% up to 100% on SVHN data. VGG16 accuracy improved from 93.12% up to 93.54% on USPS data and 33.69% up to 100% on SVHN data. The above results empirically support our hypothesis that a generic model will perform consistently well on its confident samples (inliers).

Figure 10:
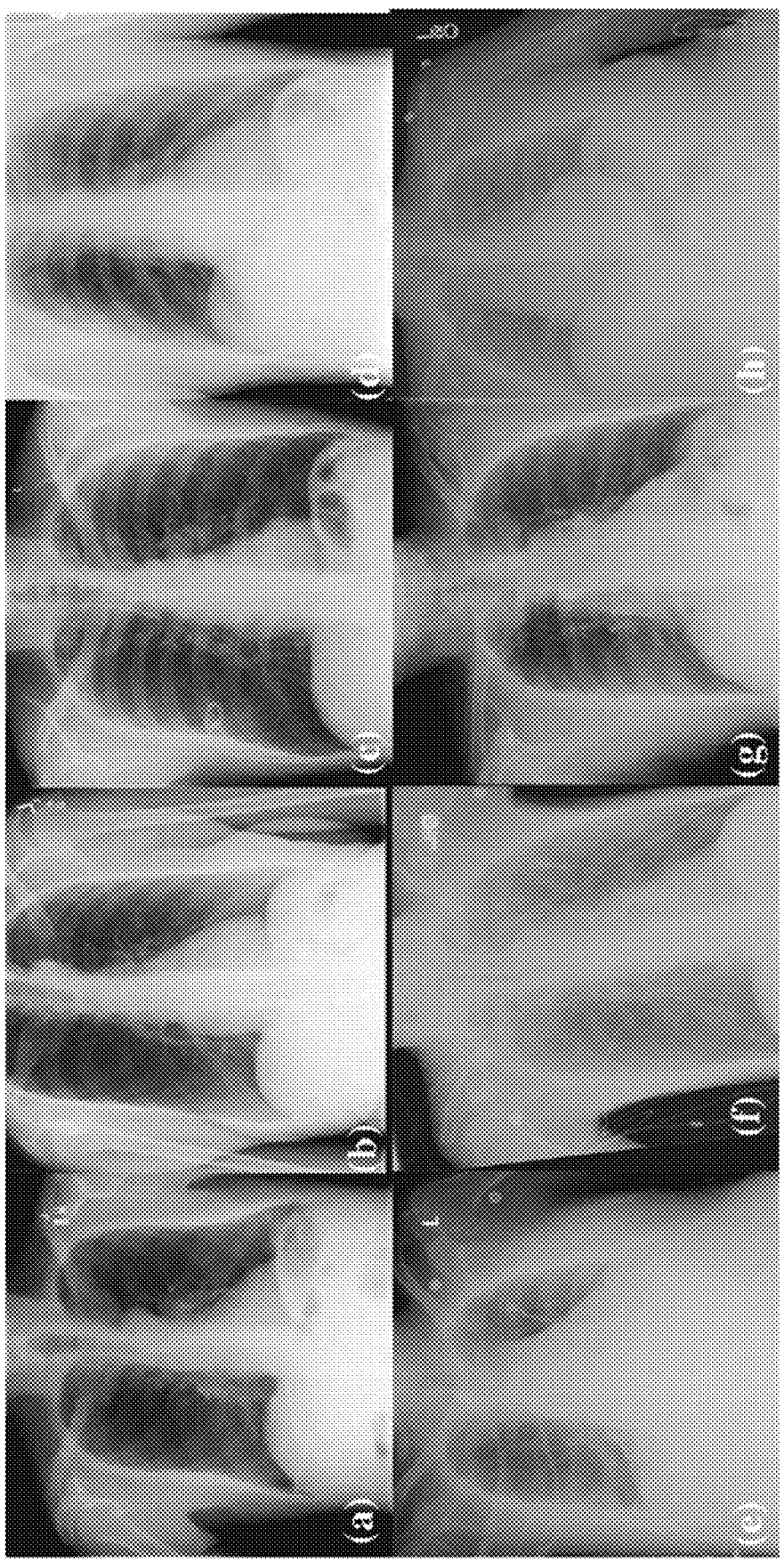
FIG. 10 presents samples of good and bad lung filed chest X-ray images from different data sources used in experimental evaluation of the disclosed techniques for determining confident data samples for ML models on unseen data in accordance with one or more embodiments of the disclosed subject matter.

FIG. 10 presents samples of good and bad lung filed chest X-ray images from different data sources used in the second experimental evaluation of the disclosed techniques for determining confident data samples for ML models on unseen data in accordance with one or more embodiments of the disclosed subject matter.

The second experimental evaluation employed the chest frontal X-ray lung field classification to evaluate the performance of the proposed method. Determination of the acceptability of a patient positioning is one of the key components for successful Quality Control (QC) in a radiology department workflow. All clipped chest X-ray lung field images were considered to belong to the bad lung field class. FIG. 10 shows examples of good and bad lung field chest X-ray images from different data sources. In particular, image (a) depicts a NIH good lung field image, image (b) NIH depicts a bad lung field image, image (c) depicts a Source 1 good lung field image, image (d) depicts a Source 1 bad lung field image, image (e) depicts a Source 2 good lung field image, image (f) depicts a Source 2 bad lung field image, image (g) depicts a Source 3 good lung field image, and image (h) depicts a Source 3 bad lung field image.

As in the MNIST experiment, the ResNet50, DenseNet121 and VGG16 were selected and trained on the NIH chest X-ray dataset. Three additional datasets from different hospitals across the United States. and Canada were collected as unseen datasets to evaluate the proposed method. The three hospitals are respectively anonymized to Source 1, Source 2 and Source 3. The NIH dataset had over 112,000 of images from more than 30,000 patients, including many with advanced lung diseases. From this large dataset, 7,856 images with good lung field where the whole lung field was clearly visible without any clipping were manually annotated. In the same manner, 4,356 images with bad lung field were also selected and manually annotated. All the models were trained only on the NIH X-ray dataset with a random split of 75%/15%/15% for training/validation/testing. The three other datasets from Sources 1, 2 and 3 were selected and manually annotated with the same criteria and used as unseen datasets.

Figure 11A:
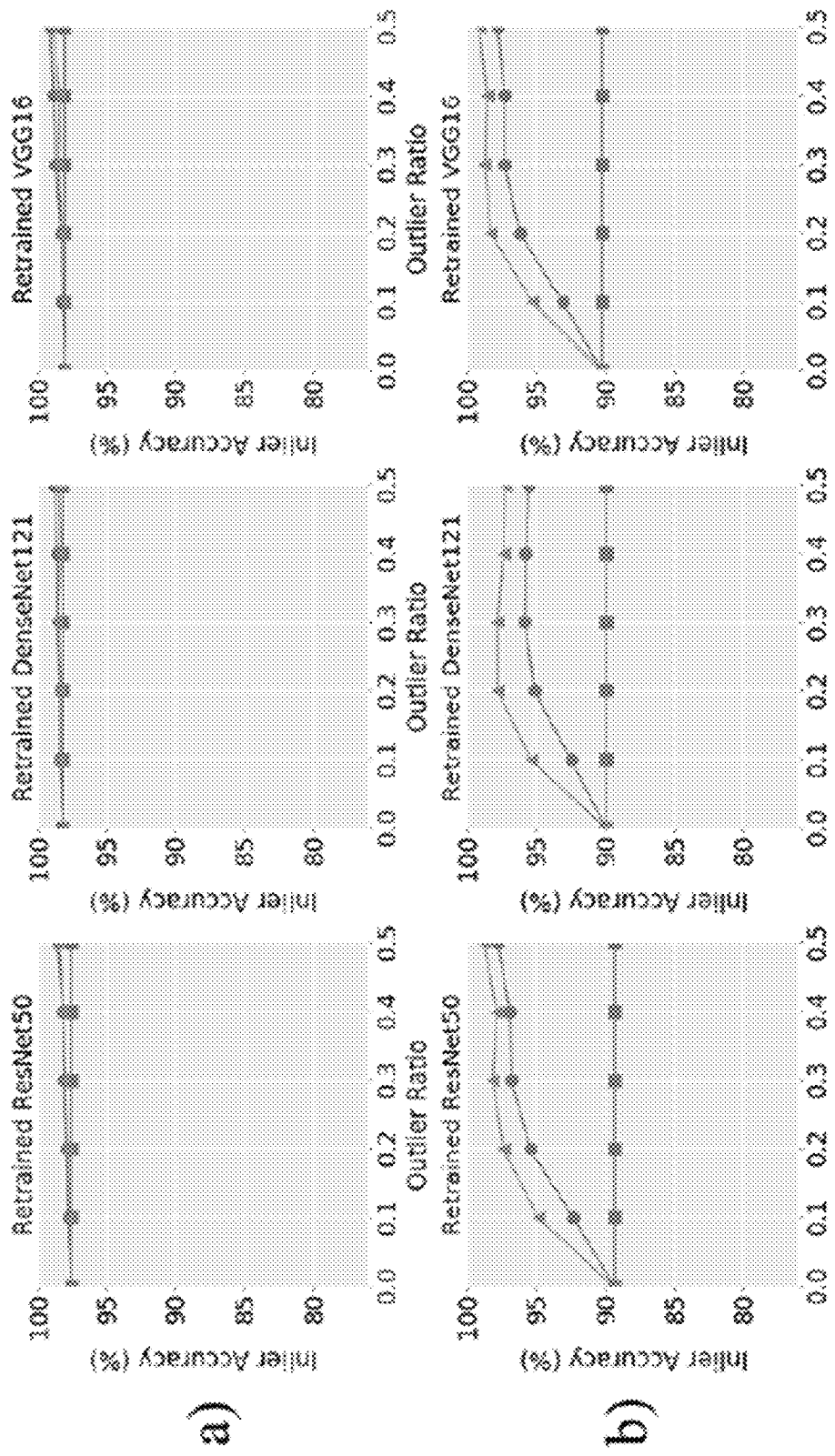
FIGS. 11A and 11B present comparative charts providing benchmark experimental results associated with the chest X-ray image experiment in accordance with one or more embodiments of the disclosed subject matter.
Figure 11B:
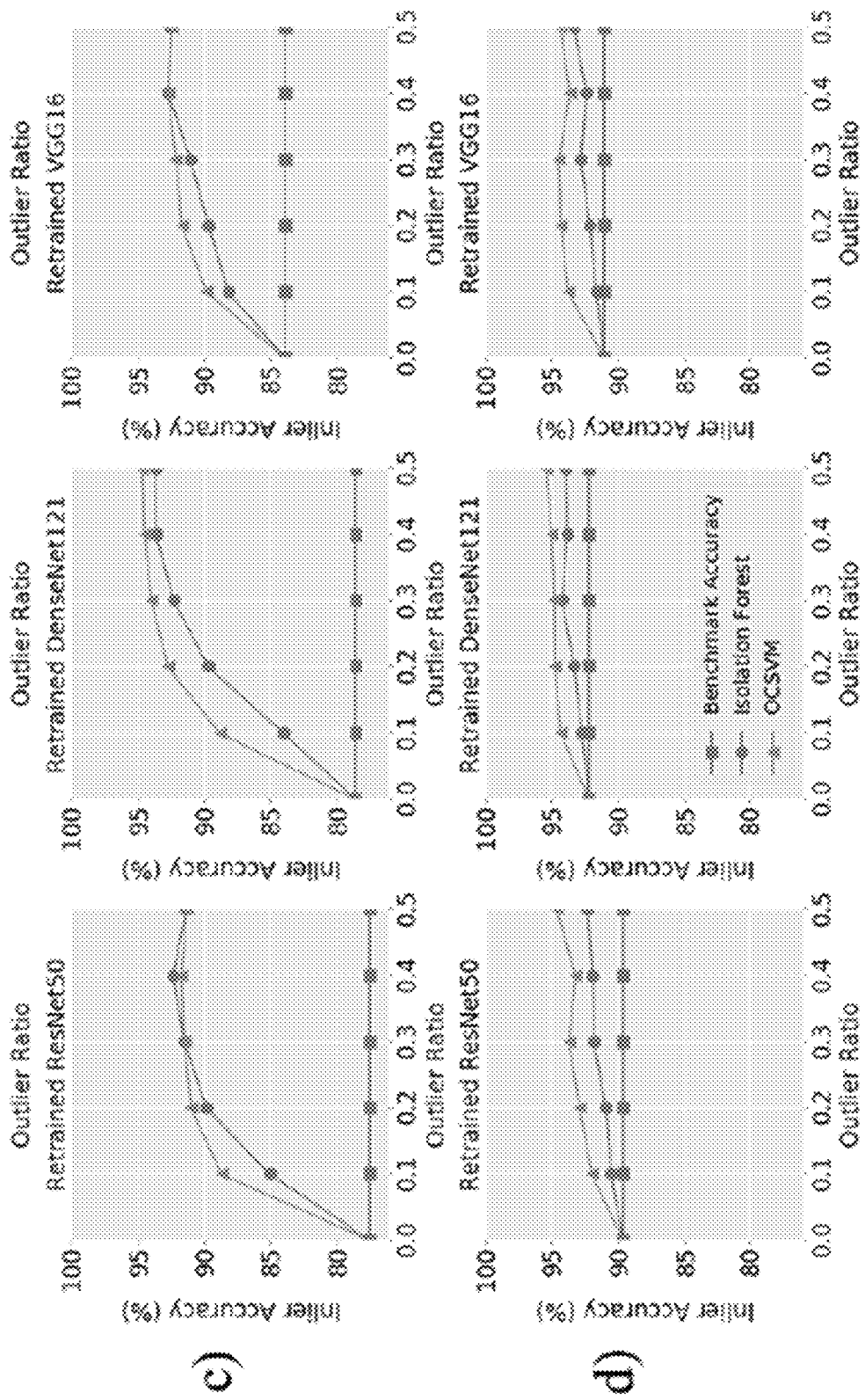

FIGS. 11A and 11B present comparative charts providing benchmark experimental results associated with the chest X-ray image experiment in accordance with one or more embodiments of the disclosed subject matter. The respective charts reflect inlier classification accuracy (%) as a function of outlier ratio across the X-ray image datasets originating from (a) NIH test, (b) Source 1, (c) Source 2, and (d) Source 3. The benchmark accuracy is again defined as the classification accuracy of the retrained DNN model on the entire unseen dataset before outlier detection.

As demonstrated in FIGS. 11A and 11B, that the model benchmark accuracy dropped substantially on the unseen datasets from Source 1, 2, and 3 when compared to the NIH test dataset benchmark accuracy. For the ResNet50 model, the accuracy performance dropped by 8.19%, 20.09% and 7.86% from the NIH test dataset on Sources 1, 2 and 3, respectively. For DenseNet121, the accuracy performance dropped by 8.31%, 19.64% and 6.03% from the NIH test dataset on Sources 1, 2 and 3, respectively. For VGG16, the accuracy performance dropped by 7.80%, 14.13% and 7.02% from the NIH test dataset on Sources 1, 2 and 3, respectively.

With respect to the inliers, FIGS. 11A and 11B show that the performance of all models improved for both IF and OCSVM across different outlier ratios. When using IF as the outlier detector, the ResNet50 accuracy improved from 89.30%, 77.40% and 89.63% up to 97.75%, 92.35% and 92.29% on Sources 1, 2 and 3, respectively. DenseNet121 accuracy improved from 89.89%, 78.56%, 92.17% up to 95.75%, 93.64% 94.21% on Sources 1, 2 and 3, respectively. VGG16 accuracy improved from 90.23%, 83.90% and 91.01% up to 97.75%, 92.71% and 93.31% on Sources 1, 2 and 3 respectively. By using OCSVM, the best accuracy that ResNet50 can achieve is up to 98.77%, 91.73% and 94.61% on Sources 1, 2 and 3, respectively. The best accuracy that DenseNet121 can achieve is up to 97.78%, 94.66%, 95.42% on Sources 1, 2 and 3, respectively. The best accuracy that VGG16 can achieve is 99.08%, 92.73% and 94.45% on data Sources 1, 2 and 3, respectively. Similar to the experimental results on the MNIST digit images, the experimental results on medical chest X-ray images also show that a generic model performed better on its confident samples (inliers) across different outlier detectors.

In conclusion, as observed in both Table 900 and the graphs shown in FIGS. 11A and 11B, the model has improved performance on the inliers of unseen data despite the fact that the model would typically not be confident on most of the samples in the unseen datasets. This can help clinicians prioritize and allocate more resources to cases where the model is not confident. However, the quality of proposed method heavily depends on the robustness of feature extractors and the outlier detectors that are used. The experiments described above, and various embodiments consider the feature space constructed from the VGG16 network trained on ImageNet. However, other standard feature spaces constructed from different state-of-art networks are envisioned to optimize model and/or tailor performance for a specific type of dataset. In some embodiments, the quality of the proposed method can be verified by evaluating its performance on a test dataset sampled from the same distribution as the training dataset.

Example Operating Environment

Figure 12:
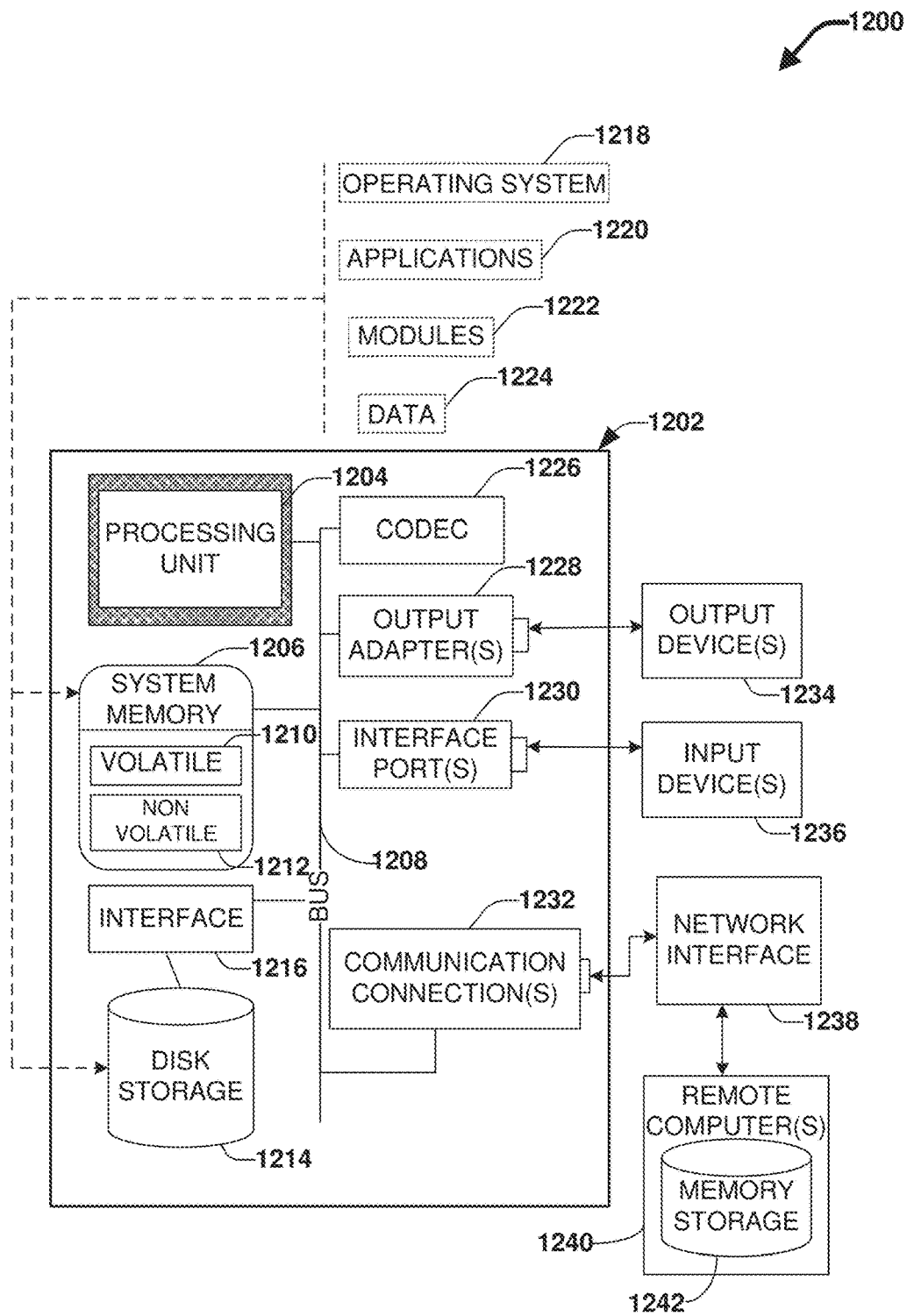
FIG. 12 illustrates a block diagram of an example, non-limiting operating environment in which one or more embodiments described herein can be facilitated.

FIG. 12 can provide a non-limiting context for the various aspects of the disclosed subject matter, intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1202. The computer 1202 can also include a processing unit 1204, a system memory 1206, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204. The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 12124), and Small Computer Systems Interface (SCSI).

The system memory 1206 can also include volatile memory 1210 and nonvolatile memory 1212. The basic input/output system (BIOS), containing the basic routines to transfer information between elements within the computer 1202, such as during start-up, is stored in nonvolatile memory 1212. Computer 1202 can also include removable/non-removable, volatile/non-volatile computer storage media. FIG. 12 illustrates, for example, a disk storage 1214. Disk storage 1214 can also include, but is not limited to, devices like a magnetic disk drive, floppy disk drive, tape drive, Jaz drive, Zip drive, LS-100 drive, flash memory card, or memory stick. The disk storage 1214 also can include storage media separately or in combination with other storage media. To facilitate connection of the disk storage 1214 to the system bus 1208, a removable or non-removable interface is typically used, such as interface 1216. FIG. 12 also depicts software that acts as an intermediary between users and the basic computer resources described in the suitable operating environment 1200. Such software can also include, for example, an operating system 1218. Operating system 1218, which can be stored on disk storage 1214, acts to control and allocate resources of the computer 1202.

System applications 1220 take advantage of the management of resources by operating system 1218 through program modules 1222 and program data 1224, e.g., stored either in system memory 1206 or on disk storage 1214. It is to be appreciated that this disclosure can be implemented with various operating systems or combinations of operating systems. A user enters commands or information into the computer 1202 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1234 use some of the same type of ports as input device(s) 1236. Thus, for example, a USB port can be used to provide input to computer 1202, and to output information from computer 1202 to an output device 1234. Output adapter 1228 is provided to illustrate that there are some output devices 1234 like monitors, speakers, and printers, among other output devices 1234, which require special adapters. The output adapters 1228 include, by way of illustration and not limitation, video and sound cards that provide a means of connection between the output device 1234 and the system bus 1208. It should be noted that other devices and/or systems of devices provide both input and output capabilities such as remote computer(s) 1240.

Computer 1202 can operate in a networked environment using logical connections to one or more remote computers, such as remote computer(s) 124. The remote computer(s) 1240 can be a computer, a server, a router, a network PC, a workstation, a microprocessor based appliance, a peer device or other common network node and the like, and typically can also include many or all of the elements described relative to computer 1202. For purposes of brevity, only a memory storage device 1242 is illustrated with remote computer(s) 1240. Remote computer(s) 1240 is logically connected to computer 1202 through a network interface 1238 and then physically connected via communication connection 1232. Network interface 1238 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1232 refers to the hardware/software employed to connect the network interface 1238 to the system bus 1208. While communication connection 1232 is shown for illustrative clarity inside computer 1202, it can also be external to computer 1202. The hardware/software for connection to the network interface 1238 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing ML and/or ML techniques to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   extracting, by a system comprising a processor, a feature vector for a data sample based on projection of the data sample onto a standard feature space;
   processing, by the system, the feature vector using an outlier detection model to determine whether the data sample is within a scope of a training dataset used to train a machine learning model, wherein the outlier detection model was trained using features extracted from the training dataset based on projection of data samples included in the training dataset onto the standard feature space;
   generating, by the system, a confidence score for the data sample using the outlier detection model, wherein the confidence score represents a measure of confidence in the machine learning model to generate an accurate inference on the data sample; and
   classifying, by the system, the data sample as an outlier data sample or an inlier data sample based on the confidence score.

2. The method of claim 1, wherein the outlier detection model classifies the data sample as an outlier data sample or an inlier data sample.

3. The method of claim 1, wherein the data samples included in the training dataset that were projected onto the standard feature space were selected based on a determination that the machine learning model generated correct inferences on the data samples during training of the machine learning model.

4. The method of claim 1, further comprising:
   generating, by the system, an outlier detection notification for the data sample based on classification of the data sample as an outlier data sample.

5. The method of claim 1, further comprising:
   sending, by the system, the data sample for manual annotation and review based on classification of the data sample as an outlier data sample.

6. The method of claim 1, further comprising:
   applying, by the system, the machine learning model to the data sample to generate an inference result based on classification of the data sample as an inlier data sample.

7. The method of claim 1, wherein the standard feature space comprises a plurality of images with annotated visual features and wherein the data sample and the data samples respectively comprise images.

8. The method of claim 1, wherein the extracting comprises employing a feature extraction network trained on the standard feature space.

9. The method of claim 8, wherein the standard feature space comprises an ImageNet feature space.

10. The method of claim 1, wherein the machine learning model comprises a deep neural network model.

11. The method of claim 1, wherein the outlier detection model employs an isolation forest (IF) outlier detection method or a one-class support vector machine (OCSVM) method.

12. A system, comprising:
    a memory that stores computer executable components; and
    a processor that executes the computer executable components stored in the memory, wherein the computer executable components comprise:
       a feature extraction component that extracts a feature vector for a data sample based on projection of the data sample onto a standard feature space; and
       an outlier detection component that processes the feature vector using an outlier detection model to determine whether the data sample is within a scope of a training dataset used to train a machine learning model, wherein the outlier detection model was trained using features extracted from the training dataset based on projection of data samples included in the training dataset onto the standard feature space, and determines a confidence score for the data sample using the outlier detection model and classifies the data sample as an outlier data sample or an inlier data sample based on the confidence score, wherein the confidence score represents a measure of confidence in the machine learning model to generate an accurate inference on the data sample.

13. The system of claim 12, wherein the outlier detection component classifies the data sample as an outlier data sample or an inlier data sample using the outlier detection model.

14. The system of claim 12, wherein the data samples included in the training dataset that were projected onto the standard feature space were selected based on a determination that the machine learning model generated correct inferences on the data samples during training of the machine learning model.

15. The system of claim 12, wherein the computer executable components further comprise:
a notification component that generates an outlier detection notification for the data sample based on classification of the data sample as an outlier data sample.

16. The system of claim 12, wherein the computer executable components further comprise:
an inferencing component that applies the machine learning model to the data sample to generate an inference output based on classification of the data sample as an inlier data sample.

17. The system of claim 12, wherein the computer executable components further comprise:
a reprocessing component that sends, the data sample for manual annotation and review based on classification of the data sample as an outlier data sample.

18. The system of claim 12, wherein the standard feature space comprises a plurality of images with annotated visual features and wherein the data sample and the data samples respectively comprise images.

19. A non-transitory machine-readable storage medium, comprising executable instructions that, when executed by a processor, facilitate performance of operations, comprising:
projecting a data sample onto a standard feature space;
extracting a feature vector for the data sample based on the projecting using a feature extraction network trained on the standard feature space;
classifying the data sample as an outlier data sample or an inlier data sample relative to a training dataset used to train a machine learning model, wherein the classifying comprises processing the feature vector using an outlier detection model that was trained using features extracted from the training dataset based on projection of the training dataset onto the standard feature space;
generating a confidence score for the data sample using the outlier detection model, wherein the confidence score represents a measure of confidence in the machine learning model to generate an accurate inference on the data sample; and
classifying the data sample as an outlier data sample or an inlier data sample based on the confidence score.

20. The non-transitory machine-readable storage medium of claim 19, wherein the operations further comprise:
generating an outlier detection notification for the data sample based on a first classification of the data sample as an outlier data sample; and
applying the machine learning model to the data sample to generate an inference result based on second classification of the data sample as an inlier data sample.

* * * * *